United States Patent
Aoki

(10) Patent No.: US 10,748,025 B2
(45) Date of Patent: Aug. 18, 2020

(54) METHOD, APPARATUS, AND NON-TRANSITORY COMPUTER-READABLE STORAGE MEDIUM FOR VERIFICATION PROCESS

(71) Applicant: FUJITSU LIMITED, Kawasaki-shi, Kanagawa (JP)

(72) Inventor: Takahiro Aoki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 301 days.

(21) Appl. No.: 15/704,596

(22) Filed: Sep. 14, 2017

(65) Prior Publication Data

US 2018/0089527 A1 Mar. 29, 2018

(30) Foreign Application Priority Data

Sep. 23, 2016 (JP) ................................. 2016-186323

(51) Int. Cl.
*G06K 9/00* (2006.01)
*G06K 9/46* (2006.01)
(Continued)

(52) U.S. Cl.
CPC ....... *G06K 9/4604* (2013.01); *G06K 9/00234* (2013.01); *G06K 9/00885* (2013.01);
(Continued)

(58) Field of Classification Search
CPC ............................ G06K 9/4604; G06K 9/6247
See application file for complete search history.

(56) References Cited

U.S. PATENT DOCUMENTS

| 5,799,082 A | * | 8/1998 | Murphy | ............. H04N 1/00127 |
| | | | | 342/357.31 |
| 2008/0193029 A1 | * | 8/2008 | Kamata | ................ G06K 9/4604 |
| | | | | 382/249 |

(Continued)

FOREIGN PATENT DOCUMENTS

| EP | 2 261 831 A2 | 12/2010 |
| JP | 2006-260311 | 9/2006 |

(Continued)

OTHER PUBLICATIONS

Friedman et al., "An Algorithm for Finding Nearest Neighbors," IEEE Transactions on Computers, Oct. 1975, XP002773305, pp. 1000-1006.

(Continued)

*Primary Examiner* — Feng Niu
(74) *Attorney, Agent, or Firm* — Staas & Halsey LLP

(57) ABSTRACT

A method for a verification process that performs neighbor discovery for one or more feature points projected to an m-dimensional space (m is a natural number equal to or greater than 2), includes: acquiring a feature point group including one or more feature points projected to coordinate values of the m-dimensional space ordered in a coordinate value order on each of two or more coordinate axes that define the m-dimensional spacer (m is a natural number equal to or greater than 2); selecting a datum axis on which a comparison time number in neighbor discovery is small, the comparison time number being obtained by performing simulation of neighbor discovery.

17 Claims, 26 Drawing Sheets

(51) Int. Cl.
*G06K 9/32* (2006.01)
*G06K 9/62* (2006.01)

(52) U.S. Cl.
CPC ......... *G06K 9/3233* (2013.01); *G06K 9/4647* (2013.01); *G06K 9/6232* (2013.01); *G06K 9/6247* (2013.01); *G06K 9/00228* (2013.01); *G06K 2009/00932* (2013.01)

(56) References Cited

U.S. PATENT DOCUMENTS

| | | | | |
|---|---|---|---|---|
| 2013/0182002 A1* | 7/2013 | Macciola | ........... | G06K 9/00463 345/589 |
| 2014/0010407 A1* | 1/2014 | Sinha | ................ | G06K 9/00664 382/103 |
| 2015/0078629 A1* | 3/2015 | Gottemukkula | ..... | G06K 9/0061 382/117 |
| 2016/0232428 A1* | 8/2016 | Engstrom | ............... | G06F 16/51 |
| 2018/0089527 A1* | 3/2018 | Aoki | ................ | G06K 9/00234 |

FOREIGN PATENT DOCUMENTS

| | | |
|---|---|---|
| JP | 2011-205172 | 10/2011 |
| JP | 2013-45141 | 3/2013 |

OTHER PUBLICATIONS

Extended European Search Report dated Feb. 19, 2018, in corresponding European Patent Application No. 17191600.0, 11 pgs.
Japanese Office Action dated Jul. 14, 2020 from Japanese Patent Application No. 2016-186323, 7 pages.

* cited by examiner

FIG. 15

| | |
|---|---|
| ATTRIBUTE INFORMATION | T11 |
| DATUM AXIS INFORMATION | T12 |
| FEATURE POINT NUMBER | T13 |
| FEATURE POINT #1 {m-DIMENSIONAL COORDINATE VALUE, FEATURE VALUE} | T14 |
| ... | |
| FEATURE POINT #K {m-DIMENSIONAL COORDINATE VALUE, FEATURE VALUE} | |
| INDEX CONVERSION PAIR #1-1 {AFTER-CONVERSION INDEX #A1} | T15A |
| ... | |
| INDEX CONVERSION PAIR #1-K {AFTER-CONVERSION INDEX #AK} | |
| INDEX CONVERSION PAIR #2-1 {AFTER-CONVERSION INDEX #B1} | T16A |
| ... | |
| INDEX CONVERSION PAIR #2-K {AFTER-CONVERSION INDEX #BK} | |

METHOD, APPARATUS, AND NON-TRANSITORY COMPUTER-READABLE STORAGE MEDIUM FOR VERIFICATION PROCESS

CROSS-REFERENCE TO RELATED APPLICATION

This application is based upon and claims the benefit of priority of the prior Japanese Patent Application No. 2016-186323, filed on 23 Sep. 2016, the entire contents of which are incorporated herein by reference.

FIELD

The embodiments discussed herein are related to a method, an apparatus, and a non-transitory computer-readable storage medium for verification process that performs neighbor discovery for one or more feature points projected to an m-dimensional space (m is a natural number equal to or greater than 2).

BACKGROUND

There is an image processing technology for finding a target pattern by a verification process for verifying a feature extracted from an image of a verification target with features defined in patterns registered in advance. As an application example of such an image processing technology as just described, character recognition, object detection, biometric authentication and so forth are listed. For example, in biometric authentication, biological information obtained from a living body using various sensors is imaged, and a verification process is performed using feature points extracted from the image obtained by the imaging of the biological information. Various types of authentication technologies have been devised for such biometric authentication, and for example, there are fingerprint authentication utilizing a fingerprint, iris authentication utilizing a thin film texture pattern of the pupil, face authentication utilizing the face, retinal authentication utilizing a blood vessel pattern on the retina, vein authentication utilizing a vein pattern of a palm or a finger and so forth.

In vein authentication that is an example of an image processing technology, from an image (biological image) of a vein pattern picked up by irradiating near infrared light upon a living body part such as a palm of a hand, a finger or the like, feature points that are characteristic points in the image are extracted, and a verification process is performed using the extracted feature points. In the verification process, calculation of a verification score with feature points defined in patterns registered in advance is performed using feature values and so forth calculated from an image in the neighborhood of the feature points. For example, a correlation value of a feature value between feature points on the image and feature points on the registration patterns, a humming distance between bit series of the feature values or the like is utilized as a verification score.

Increase of the number of feature points that are a verification target causes increase the period of time for obtaining a verification result because the number of arithmetic operation targets in the verification process increases. For example, in one-to-many verification (hereinafter, referred to as 1:N verification (N is a natural number equal to or greater than 2)) for verifying a picked up image and a plurality of registration patterns with each other, as the number N of registration patterns that are a verification target increases, increase of the verification time period becomes more conspicuous. Therefore, in a certain conventional technology, an attempt to restrict the verification target among a plurality of feature points is proposed. For example, it is proposed to map, when similarity between two images is evaluated, feature points in an m-dimensional space (m is a natural number equal to or greater than 2) to a one-dimensional space and evaluate the similarity of the images using the distance between the feature points of the two images mapped to the one-dimensional space thereby to reduce the arithmetic operation cost in similarity evaluation. In another conventional technology, in a verification process for specifying data having a coordinate value of the nearest neighbor point whose point-to-point distance to a datum point is smallest, data are sorted in a coordinate value order on a datum coordinate axis set in advance and then data having a coordinate value whose point-to-point distance to the datum point in the datum coordinate axis direction is smaller than a threshold value set in advance are selected, accordingly to restrict the verification target is proposed.

SUMMARY

According to an aspect of the embodiments, a method, performed by a computer, for a verification process that performs neighbor discovery for one or more feature points projected to an m-dimensional space (m is a natural number equal to or greater than 2), the method comprising: executing, by a processor of the computer, a step A1 that includes determining each of two or more coordinate axes that define the m-dimensional space (m is a natural number equal to or greater than 2) as a datum axis and acquiring a feature point group including one or more feature points projected to coordinate values of the m-dimensional space ordered in a coordinate value order on the datum axis; executing, by the processor of the computer, a step A2 that includes acquiring, for the feature point group for each of the datum axes, a datum point group including one or more datum points acquired from the one or more feature points of the feature point group and a reference point group including one or more reference points acquired from the one or more feature points of the feature point group; executing, by the processor of the computer, a step A3 that includes, for each of the datum axes, discovering a reference point whose distance to each of the datum points of the datum point group on the datum axis in an ordering direction order of the reference point group is smaller than a threshold value for neighbor discovery; executing, by the processor of the computer, a step A4 that includes acquiring a comparison time number for each of the datum axes by executing a step A4-1, another step A4-2, and a further step A4-3, the step A4-1 being a process that counts a comparison time number between the datum point and the reference point in a discovery process for the reference point, the step A4-2 being a process that finally determines the comparison time number with regard to the datum point in response to detection of a reference point whose distance to the datum point on the datum axis is equal to or greater than the threshold value, the step S4-3 being a process that totals the comparison time number with regard to the datum points of the datum point group; and executing, by the processor of the computer, a step A5 that includes selecting, from among the datum axes individually corresponding to the two or more coordinate axes, the datum axis whose comparison time number is small as the datum axis used in the neighbor discovery in the verification process.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 15 is a view illustrating an example of registration data (m=3) according to the working example 2;

DESCRIPTION OF EMBODIMENTS

Figure 1:
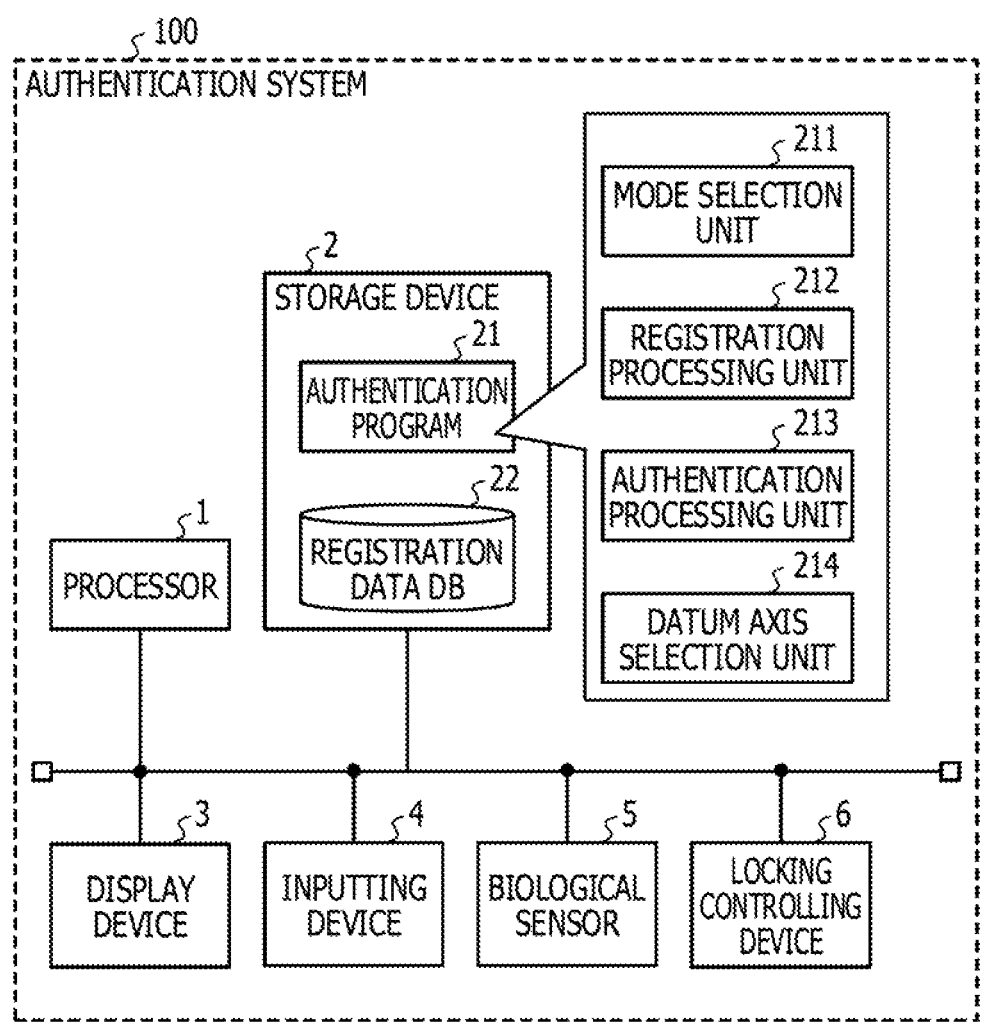
FIG. 1 is a block diagram depicting an example of a configuration of an authentication system that uses a verification method according to a working example 1.

In the two conventional technologies described above, in order to reduce the arithmetic operation cost for a verification process, the distance between feature points of two images mapped to one-dimensional space is used. Further, it is disclosed that, as a criterion for selecting a datum coordinate axis for mapping, a coordinate axis on which the value (distribution width) when the lowest value is subtracted from the highest value of coordinate values the feature points have is highest is determined as a datum coordinate axis.

However, in biometric authentication such as palm vein authentication, fingerprint authentication, or iris authentication, arising from the fact that the aspect ratio of an image pickup range of a living body part or of a range in which feature points are extracted from a biological image is approximately 1:1 or from some other reason, realistically it is rare that a distribution width of feature points obtained from a biological image indicates a significant difference on individual coordinate axes (for example, on an X axis and a Y axis) that define an m-dimensional space. For example, in the case of palm vein authentication, a palm that is a portion of a hand from which the wrist and the thumb and fingers are excluded and is a portion that comes to the inner side when the hand is closed indicates, the ratio of vertical and horizontal in a state in which the hand is open is approximately 1:1. Therefore, feature points extracted from a pattern of veins existing on the inside of the palm are often distributed within an aspect ratio of approximately 1:1. This similarly applies also to the other biometric authentications. Besides, one or more feature points (feature point group) obtained from a biological image may not be necessarily distributed uniformly over an m-dimensional space.

The conventional technologies have a problem that, when it is difficult to find a significant difference within a distribution range of feature points, for example, on two axes (for example, on the X axis and the Y axis) that define a two-dimensional space, it may not be necessarily possible to select an optimum datum axis. Such a problem as just described is not restricted to biometric authentication and may possibly occur with a different image recognition system that involves object detection, character recognition or the like when the ratio of the distribution range of feature points is substantially equal on all or some of the m axes that define an m-dimensional space. For example, a similar problem may possibly occur where it is difficult to specify, from among m axes that define an m-dimensional space, one axis on which the distribution range of feature points is conspicuously greater than those on the other m−1 axes.

Therefore, the embodiments discussed herein provide a verification method, a verification apparatus, and a verification program that may improve the response speed while the verification accuracy of feature points is maintained by selecting an optimum datum axis with which the arithmetic operation cost for neighbor discovery in a verification process of feature points in an m-dimensional space may be reduced.

In the following, embodiments are described with reference to the drawings. The configuration of the embodiments is exemplary and the configuration is not limited that of the embodiments.

Working Example 1

FIG. 1 is a block diagram depicting an example of a configuration of an authentication system that uses a verification method according to a working example 1. An authentication system 100 depicted in FIG. 1 includes a processor 1, a storage device 2, a display device 3, an inputting device 4, a biological sensor 5, a locking controlling device 6 and so forth. The components mentioned are coupled for communication with each other by wire communication by a bus or the like or by wireless communication and may be accommodated in one housing, or all or some of the components may be accommodated in an independent housing.

The processor 1 is an arithmetic operation device that implements an authentication function including a verification process according to the working example 1 by executing an authentication program 21 stored in the storage device 2. For example, the processor 1 is converted into a hardware circuit that provides the authentication process including the verification process according to the working example 1 by executing the authentication program 21 read in from the storage device 2. As such a processor 1 as just described, for example, a central process unit (CPU), a micro processing unit (MPU), a digital signal processor (DSP), a field programmable gate array (FPGA) and so forth are mentioned. It is to be noted that the processor 1 may be a multicore processor including two or more cores.

The storage device 2 is a device that stores and retains the authentication program 21 that is executed by the processor 1, a registration data database (DB) 22 used by the authentication function, temporary data that is referred to or written in when the processor 1 performs a process and so forth. The storage device 2 is configured including both or at least one of a nonvolatile storage device and a volatile storage device. For example, a random access memory (RAM), a read only memory (ROM), a solid state drive (SSD), a hard disk drive (HDD) and so forth are mentioned.

The display device 3 is configured so as to display a result of a process of the authentication function executed by the processor 1 and so forth. For example, a liquid crystal display (LCD), an organic electroluminescence (OEL) display, an organic light emitting diode (OLED) display and so forth are mentioned.

The inputting device 4 is configured to output an input signal according to an inputting operation by a user to the processor 1. As an example of the inputting device 4, a touch pad that may input a position by tracing a sensor in the form of a flat plate with a finger, a keyboard, a mouse, a card reader of the contact type or the contactless type, a combination of them and so forth are listed. It is to be noted that a touch panel that is a combination of the inputting device 4 and the display device 3 may be used. In accordance with an inputting operation by the user, the inputting device 4 may output, for example, a signal for selecting one of a registration mode and an authentication mode as an action mode of the authentication system 100 to the processor 1. Further, the inputting device 4 may output attribute information such as a user identification (ID) of a user or the like to the processor 1 in response to an operation of the inputting device 4 by the user.

The biological sensor 5 is a sensor that acquires a biological image. As an example of the biological image, an image of a thin film texture pattern of the pupil, an image of a blood vessel pattern on the retina, a fingerprint image, a palm vein image and so forth are listed. A sensor that uses a suitable one of various known principles may be used in response to the type of a biological image of the target. For example, a biological sensor that acquires a vain image representative of a vein pattern of a palm includes a light emitting diode (LED) that irradiates near infrared light upon a palm, and an area sensor formed from a two-dimensional array of image pickup elements having sensitivity to near infrared light. For example, a complementary metal oxide semiconductor (CMOS) camera provided with a lighting for irradiating infrared light is mentioned.

The locking controlling device 6 is configured such that it receives an authentication result by the authentication function implemented by the processor 1 and controls whether or not access to a protection target by the user is permitted. For example, the locking controlling device 6 may be configured such that, if the authentication result by the authentication function is authentication success, the locking controlling device 6 cancels locking of a door of a room whose entry is restricted, but if the authentication result is authentication failure, the locking controlling device 6 does not cancel the locking of the door. Alternatively, the locking controlling device 6 may be configured such that it controls not physical locking of a door but permission of an electronic transaction such as a transaction in which an account at a financial institution such as a bank is used in response to an authentication result by the authentication function. For example, the locking controlling device 6 is configured such that it permits, when the authentication result is authentication success, access to the account in the financial institution, but does not permit, when the authentication result is authentication failure, access to the account in the financial institution. For example, the locking controlling device 6 may be configured such that it controls permission of access to a storage region, to which access is restricted, of the storage device 2 in response to the authentication result by the authentication function. It is to be noted that the locking controlling device 6 is not a presence independent of other apparatus, and for example, the function of the locking controlling device 6 may be implemented by the processor 1.

The authentication program 21 stored in the storage device 2 is executed by the processor 1 if it is deployed for execution into a memory such as a RAM that configures the storage device 2. By execution of the authentication program 21 by the processor 1, various functioning units such as a mode selection unit 211, a registration processing unit 212, an authentication processing unit 213, and a datum axis selection unit 214 are implemented. For example, the processor 1 is converted into a hardware circuit that implement the functions described above by executing the authentication program 21.

The mode selection unit 211 is a functioning unit configured to select an action mode of the authentication system 100 from between a registration mode in which a process for registering new biological data into the registration data DB 22 is performed and an authentication mode in which a process for authenticating a biological image acquired from the biological sensor 5 is performed using registration data registered already in the registration data DB 22. For example, the mode selection unit 211 is configured such that it receives an input signal according to a selection operation of an action mode by the user from the inputting device 4 and selects an action mode based on the input signal and then instructs a functioning unit according to the selected action mode to start execution of the action mode.

The registration processing unit 212 is a functioning unit that implements a process in the registration mode. For example, the registration processing unit 212 is configured such that it extracts feature points projected to an m-dimensional space from a biological image acquired from the biological sensor 5, generates new registration data using the feature points extracted from the biological image, and stores the generated registration data into the registration data DB 22. It is to be noted that the registration processing unit 212 in the present working example performs, in the process for generating registration data using the feature points extracted from the biological image, selection of an optimum datum axis in the m-dimensional space by the datum axis selection unit 214 in the present working example and ordering of the feature points in a coordinate value order on the selected datum axis are performed.

The authentication processing unit 213 is a functioning unit that implements a process in the authentication mode. For example, the authentication processing unit 213 is configured such that it extracts feature points (verification data) projected to the m-dimensional space from a biological image acquired from the biological sensor 5, performs verification between the verification data and registration data registered in the registration data DB 22, and outputs success/failure of the authentication in response to a result of the verification. It is to be noted that the authentication processing unit 213 in the present working example performs, in a verification process between the verification data and the registration data, selection of an optimum datum axis in the m-dimensional space by the datum axis selection unit 214 according to the present working example and verification of the feature points in a coordinate value order on the selected datum axis. The verification process between the verification data and the registration data by the authentication processing unit 213 is an example of a verification process of feature points.

The datum axis selection unit 214 is configured such that it selects an optimum datum axis in the m-dimensional space according to a distribution of feature points extracted from a biological image. For example, the datum axis selection unit 214 is configured such that it accepts one or more feature points (feature point group) each having a coordinate value in the m-dimensional space as an input thereto, orders the inputted feature point group in a coordinate value order on each coordinate axis of the m-dimensional space to generate m ordered feature point groups, performs neighbor discovery on a datum axis used for ordering for each of the m feature point groups to count the number of feature points (comparison time number) used as a comparison target in the neighbor discovery on the datum axis, and selects the datum axis of the feature point group that indicates the smallest comparison time number as a optimum datum axis. The process of neighbor discovery by the datum axis selection unit 214 is an example of a verification process of feature points.

Figure 2:
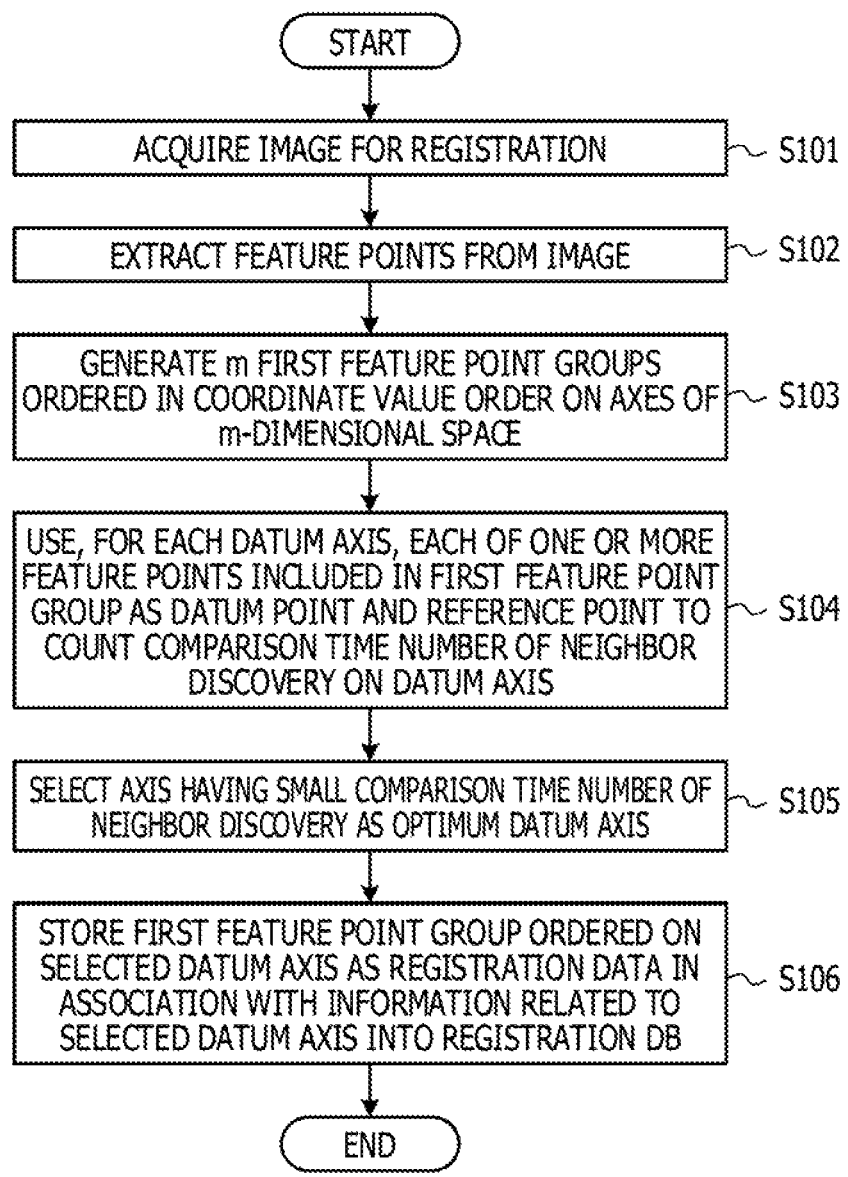
FIG. 2 is a flow chart illustrating an example of processes in a registration mode implemented by a registration processing unit in the working example 1.

FIG. 2 is a flow chart illustrating an example of processes in a registration mode implemented by a registration processing unit in the working example 1. The registration processing unit illustrated by reference to FIG. 2 may be the registration processing unit 212 depicted in FIG. 1. It is to be noted that some of the processes illustrated in FIG. 2 are implemented by the datum axis selection unit 214 in the present working example. Execution of the processes illustrated in FIG. 2 is started taking it as a trigger that, for example, the mode selection unit 211 selects the registration mode based on an input signal from the inputting device 4.

First, the processor 1 acquires a biological image obtained by image pickup of a living body part (for example, a palm, a finger or the like) of a subject (user) to be registered into the registration data DB 22 from the biological sensor 5 (S101).

The processor 1 acquires one or more feature points used as registration data in the authentication process from the biological image (102). Each feature point has a coordinate value in the m-dimensional space (m=natural number equal to or greater than 2) and a feature value. As a method for extracting one or more feature points used for authentication from a biological image, a known method may be used. For example, where a palm vein image is used as the biological image, the processor 1 distinguishes a subject region in which a hand is reflected and a background region in which no hand is reflected based on the luminance value of pixels on the vein image. When a palm vein image is generated by imaging reflected light of near infrared light irradiated upon the palm, the luminance value of pixels in the subject region is higher than the luminance value of pixels in the background region. Therefore, a set of pixels having luminance values equal to or higher than a given threshold value for subject determination may be extracted as a subject region. The threshold value for subject determination may be set, for example, by referring to a fixed value set in advance, an average value of the luminance value of pixels in the image or the like.

Further, the processor 1 determines a subject region or a rectangular region included in the subject region as an extraction region and binarizes pixels in the extraction region with a threshold value for vein determination to produce a binarization image binarized to a set of pixels on which a vein may possibly be reflected and a set of the other pixels. For example, the luminance value of a pixel on which a vein is reflected is lower than the luminance value of a pixel around the first-mentioned pixel. This arises from reduced hemoglobin in the vein. This is because, since reduced hemoglobin in the vein absorbs near infrared light in comparison with oxygenated hemoglobin in an artery, if near infrared light is irradiated upon a palm to pick up an image of the palm, the vein including reduced hemoglobin absorbs near infrared light and the blood vessel pattern of the vein is reflected dark. Therefore, the processor 1 may determine that pixels having luminance values lower than the threshold value for vein determination are pixels (vein pixels) on which a vein may possibly be reflected and pixels having luminance values equal to or higher than the threshold value for vein determination are pixels on which no vein is reflected. The threshold value for vein determination may be set, for example, by referring to an average value of the luminance value of pixels in the subject region or the like. Alternatively, the threshold value for vein determination may be determined by applying a known algorithm such as the "Otsu's binarization method" to a distribution of luminance values of pixels in the subject region. Further, the processor 1 performs a process for thinning a vein pattern, which is a set of vein pixels on a binarization image to a line having, for example, a one-pixel width using a known algorithm and extracts a position of a branch point, an end point or the like on the thinned vein pattern as a feature point. Thereupon, the processor 1 may refer to the width of the vein pixels on the binarization image before the thinning (for example, the thickness of the blood vessel of the vein) to acquire coordinate values including a value in the depthwise direction (for example, a distance from the biological sensor) at the extracted feature point. For example, the processor 1 may store, utilizing the characteristic that, as the distance from the biological sensor increases, the thickness of a blood vessel of a vein apparently looks thinner and, as the distance decreases, the thickness apparently looks thicker, a correspondence relationship between the apparent thickness and the distance of a blood vessel into the storage device 2 in advance such that it acquires a coordinate value indicative of the depthwise value (distance) of a feature point from the width of vein pixels on a binarization image before thinning based on the correspondence relationship. Alternatively, the processor 1 may use two biological images picked up by stereo image pickup using two biological sensors to acquire a coordinate value including a depthwise value (for example, a distance from the biological sensors) at each feature point by a known technique of triangulation.

Further, the processor 1 refers to pixels (peripheral pixels) in a local rectangular region of a given pixel number centered at the position of an extracted feature point and sets a feature value at the feature point using a known technique such as local phase quantization (LPQ), local binary pattern (LBP), scale-invariant feature transform (SIFT)/speeded up robust features (SURF), oriented FAST and rotated binary robust independent elementary features (BRIEF) (ORB), BRIEF, binary robust invariant scalable keypoints (BRISK), D-Nets, or KAZE. It is to be noted that, in extraction of a feature point used in an authentication process from a biological image described above or prior to such extraction of a feature point, a normalization process of the biological image may be performed. Affine transformation such as expansion, reduction, rotation, or parallel translation for pixels in a subject region may be performed using the shape or the like of the entirety or part of the subject region on the biological image to perform positioning such that the subject region is positioned within a given range of the image.

Figure 3:
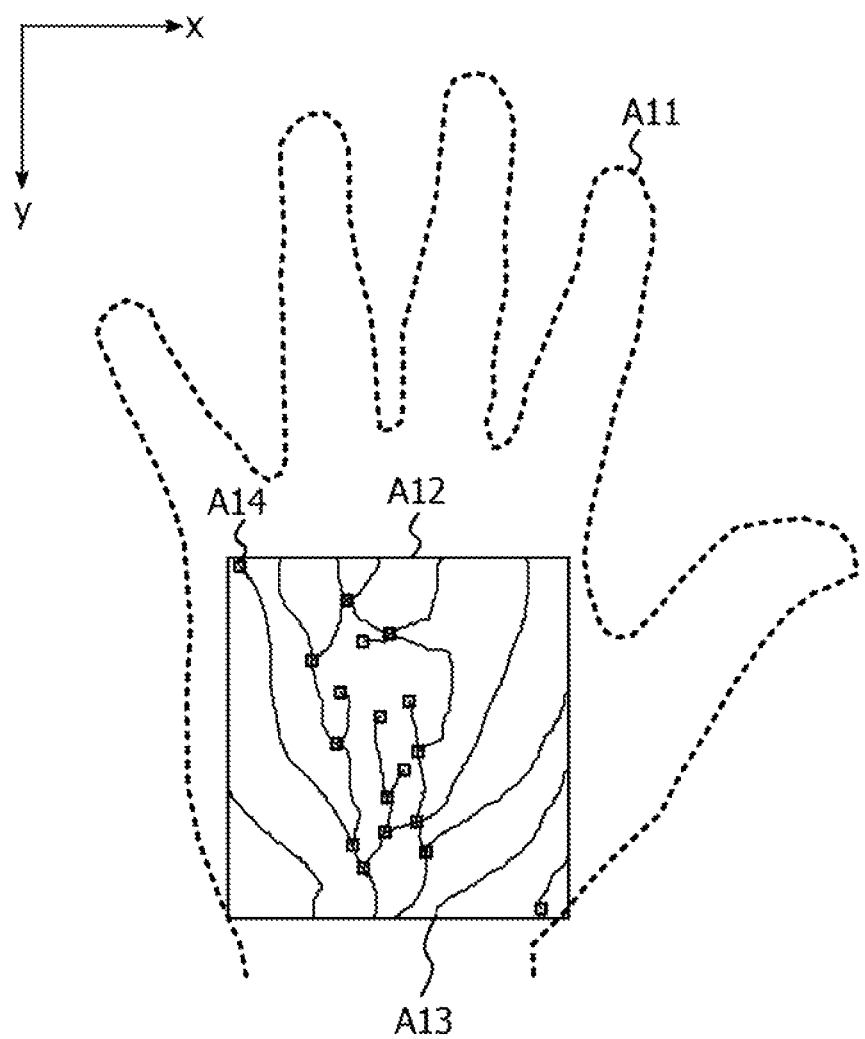
FIG. 3 is a view (part 1) depicting an example of a biological image used for extraction of feature points.

FIG. 3 is a view (part 1) depicting an example of a biological image used for extraction of a feature point. In FIG. 3, in a two-dimensional space in which the horizontal direction is set to the X axis and the vertical direction is set to the Y axis, a subject region A11 in which a hand is reflected is indicated by a broken line and a rectangular region A12 included in the subject region A11 is indicated by a solid line rectangle. In the rectangular region A12, a vein pattern A13 obtained by binarization, thinning and so forth is indicated by a solid line, and one or more feature points A14 extracted from the vein pattern A13 are indicated each by a white spot. It is to be noted that the palm that is a portion of a hand from which the wrist and the thumb and fingers are excluded and is a portion that comes to the inner side when the hand is closed indicates a ratio of vertical and horizontal of approximately 1:1 in a state in which the hand is open. Therefore, in the example depicted in FIG. 3, the extraction region that is a range from which biological information is extracted is set as a range including a region in which the palm is reflected or a range included in the region in which the palm is reflected, and has an aspect ratio of approximately 1:1. In the present working example, in the biological image obtained from the biological sensor 5, the entire hand may not be determined as a subject. For example, the range indicated by the rectangular region A12 may be determined as a biological image obtained from the biological sensor 5.

Figure 4:
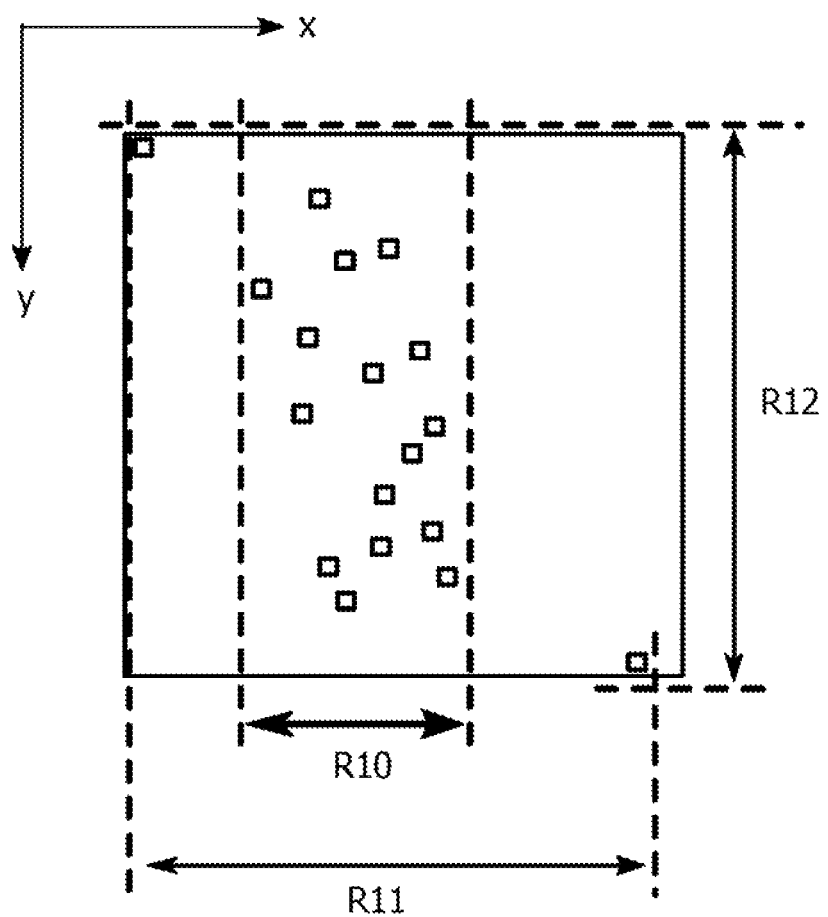
FIG. 4 is a view (part 1) illustrating a distribution of feature points extracted from a biological image.

FIG. 4 is a view illustrating a distribution of feature points extracted from the biological image exemplified in FIG. 3. In the example of FIG. 4, a distribution width indicated by a maximum value and a minimum value of the coordinate values of the feature points is substantially equal on the coordinate axes. For example, the ratio (aspect ratio) between a distribution width R11 on the X axis and a distribution width R12 on the Y axis is approximately 1:1. On the other hand, while, on the Y axis, the coordinate points are distributed uniformly, on the X axis, the coordinate points are distributed in a concentrated manner within a local range R10. Therefore, in the example of FIG. 4, when the feature points are ordered in the coordinate value order on the X axis, the target of neighbor discovery on the X axis may not be limited to an appropriate number within the range R10, and the number of feature points to be made a comparison target in neighbor discovery on the X axis (comparison time number) increases, which increases the arithmetic operation cost. On the other hand, if the feature points are ordered in the coordinate value order on the Y axis, the target of neighbor discovery on the Y axis may be restricted to an appropriate number in any range in the distribution width R12. Therefore, the comparison time number in neighbor discovery on the Y axis may be suppressed and the efficiency in neighbor discovery may be improved.

Figure 5:
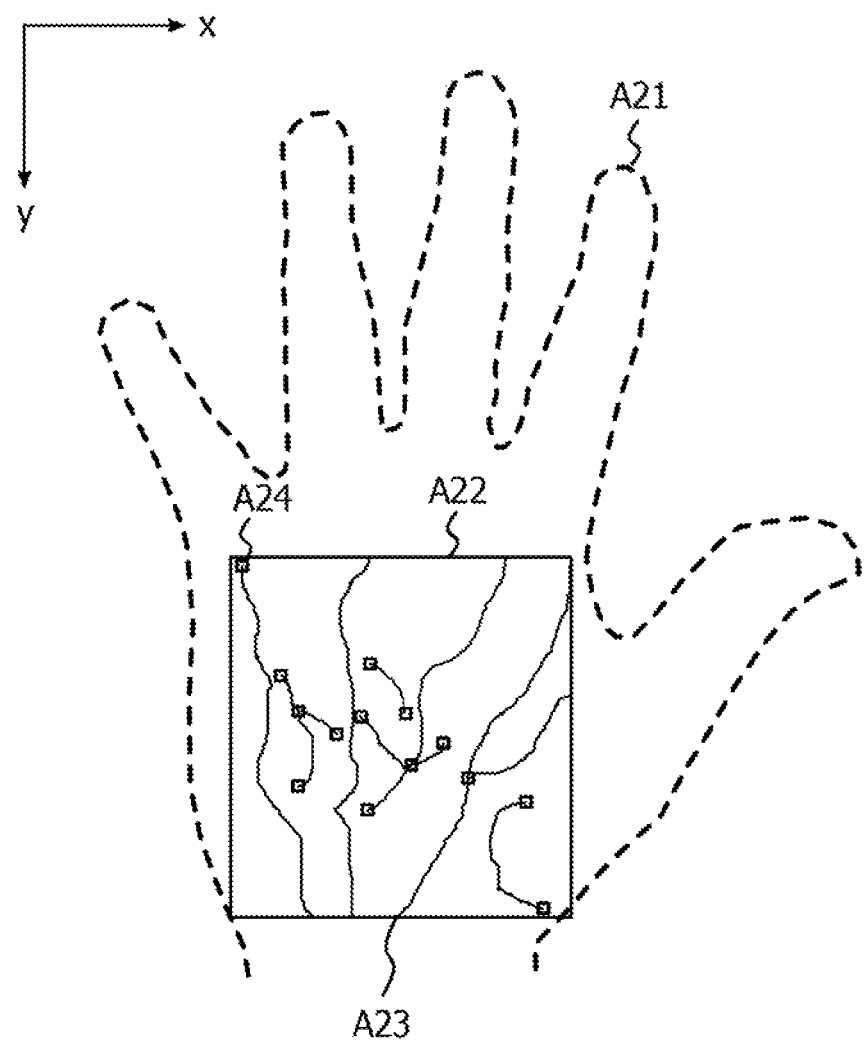
FIG. 5 is a view (part 2) depicting another example of a biological image used for extraction of feature points.

FIG. 5 is a view (part 2) depicting another example of a biological image used for extraction of feature points. In FIG. 5, in a two-dimensional space in which the horizontal direction is set as an X axis and the vertical direction is set as a Y axis, a subject region A21 in which a hand is reflected is indicated by a broken line and a rectangular region A22 included in the subject region A21 is indicated by a solid line rectangle similarly as in FIG. 3. In the rectangular region A22, a vein pattern A23 obtained by binarization, thinning and so forth is indicated by a solid line, and one or more feature points A24 extracted from within the vein pattern A23 are indicated each by a white spot similarly as in FIG. 3. It is to be noted that the palm that is a portion of a hand from which the wrist and the thumb and fingers are excluded and is a portion that comes to the inner side when the hand is closed indicates a ratio of vertical and horizontal of approximately 1:1 in a state in which the hand is open. Therefore, in the example depicted in FIG. 5, the extraction region that is a range from which biological information is extracted is set within a range including a region in which the palm is reflected or a range included in the region in which the palm is reflected, and has an aspect ratio of approximately 1:1. In the present working example, in the biological image obtained from the biological sensor 5, the entire hand may not be determined as a subject. For example, the range indicated by the rectangular region A22 may be determined as a biological image obtained from the biological sensor 5.

Figure 6:
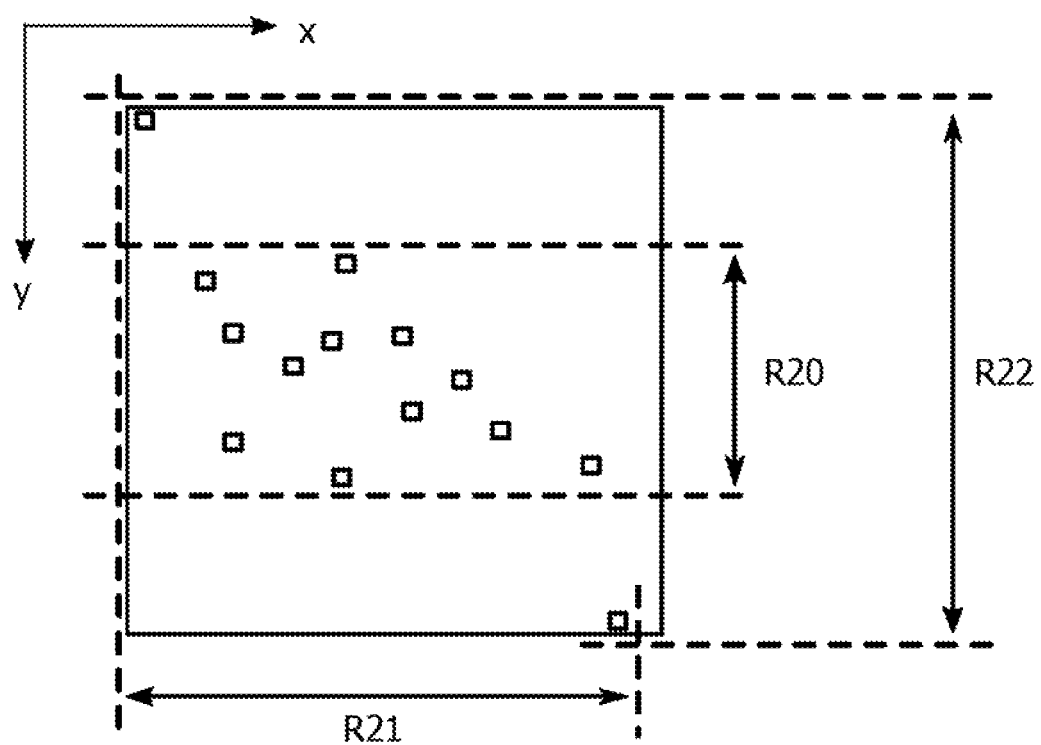
FIG. 6 is a view (part 2) illustrating a distribution of feature points extracted from a biological image.

FIG. 6 is a view illustrating a distribution of feature points extracted from the biological image exemplified in FIG. 5. In the example of FIG. 6, a distribution width indicated by a maximum value and a minimum value of the coordinate values of the feature points is substantially equal on the coordinate axes similarly as in FIG. 4. For example, the ratio between a distribution width R21 on the X axis and a distribution width R22 on the Y axis (the ratio may be referred to also as aspect ratio) is approximately 1:1. On the other hand, while, on the X axis, the feature points are distributed uniformly, on the Y axis, the feature points are distributed in a concentrated manner within a local range R20. Therefore, in the example of FIG. 6, when the feature points are ordered in the coordinate value order on the Y axis conversely to the example of FIG. 4, the target of neighbor discovery may not be limited to an appropriate number within the range R20, and the number of feature points to be made a comparison target in neighbor discovery on the Y axis (comparison time number) increases, which increases the arithmetic operation cost. On the other hand, if the feature points are ordered in the coordinate value order on the X axis, the target of neighbor discovery on the X axis may be restricted to an appropriate number in any range in the distribution width R21. Therefore, the comparison time number in neighbor discovery on the X axis may be suppressed and the efficiency in neighbor discovery may be improved.

As described hereinabove, in the example of FIG. 4, if a feature point group ordered in the coordinate value order on the Y axis determined as a datum axis is used to perform neighbor discovery on a datum axis (Y axis), the efficiency in neighbor discovery is improved in comparison with an alternative case in which the X axis is determined as a datum axis. On the other hand, in the example of FIG. 6, if a feature point group ordered in the coordinate value order on the X axis determined as a datum axis is used to perform neighbor discovery on the datum axis (X axis), the efficiency in neighbor discovery is improved in comparison with an alternative case in which the Y axis is determined as a datum axis. However, in both examples of FIGS. 4 and 6, the distribution widths of feature points on the coordinate axes are substantially equal to each other, and therefore, it is difficult to select an optimum datum axis for neighbor discovery based on a distribution width. For example, where ratios (for example, aspect ratios) in dimension on the coordinate axes of regions (for example, extraction regions) in which biological patterns (for example, palm vein patterns) that become sources of feature points are deployed are substantially equal (for example, approximately 1:1), the distribution widths of the feature points on the axes rarely indicate a significant difference. Besides, since the feature points may not be necessarily distributed uniformly on the coordinate axes, there is a problem that, even if a datum axis is selected based on the distribution widths of the feature points on the coordinate axes, the efficiency in neighbor discovery may possibly decrease. Therefore, in the present working example, the datum axis selection unit 214 performs a process for performing, using a feature point group ordered in the coordinate value order using each axis of an m-dimensional space as a datum axis, simulation (simulated arithmetic operation) of neighbor discovery on the datum axes, counting the number (comparison time number) of feature points that become a comparison target in neighbor discovery on the datum axes, and selecting the datum axis of the feature point group on which the comparison time number is smaller as an optimum datum axis for neighbor discovery. In the flow of the registration process exemplified in FIG. 2, the processes from the process S103 to the process S105 are an example of processes by the datum axis selection unit 214.

Referring back to FIG. 2, the description of the processes is continued. The processor 1 generates, from the one or more feature points acquired by S102, m feature point groups (first feature point groups) ordered in the coordinate value order on the datum axes using the coordinate axes that define the m-dimensional space as the datum axes (S103). For example, in the case of feature points projected to a two-dimensional space, a first feature point group in which the feature points are ordered in the coordinate value order on the X axis and another first feature point group in which the feature points are ordered on the coordinate value order on the Y axis are generated. It is to be noted that, where, as a scanning direction of pixels when feature points are extracted from a biological image, the X axis is determined as a main scanning direction and the Y axis is determined as a sub scanning direction, one or more feature points extracted from a biological image are placed into a state in which they are ordered in the coordinate value order on the Y axis that is the sub scanning direction. Therefore, the processor 1 may treat the one or more feature points acquired from the biological image by the process S102 as a first feature point group in which they are ordered in the coordinate value order on the Y axis. In this case, by performing only a process for ordering the feature points in the coordinate value order on the X axis that is an axis different from the sub scanning direction, two first feature point groups ordered in the coordinate value order on the individual datum axes may be acquired.

The processor 1 determines, for the first feature point group ordered in the coordinate value order on each datum axis, each of one or more feature points included in the first feature point group as a datum point and a reference point and counts the number of feature points (comparison time number) that become a comparison target in neighbor discovery on the datum axis (S104). It is to be noted that the neighbor points detected by the neighbor discovery on the datum axis may be different from the neighbor points that become an arithmetic operation target of a verification score in the verification process.

Figure 7:
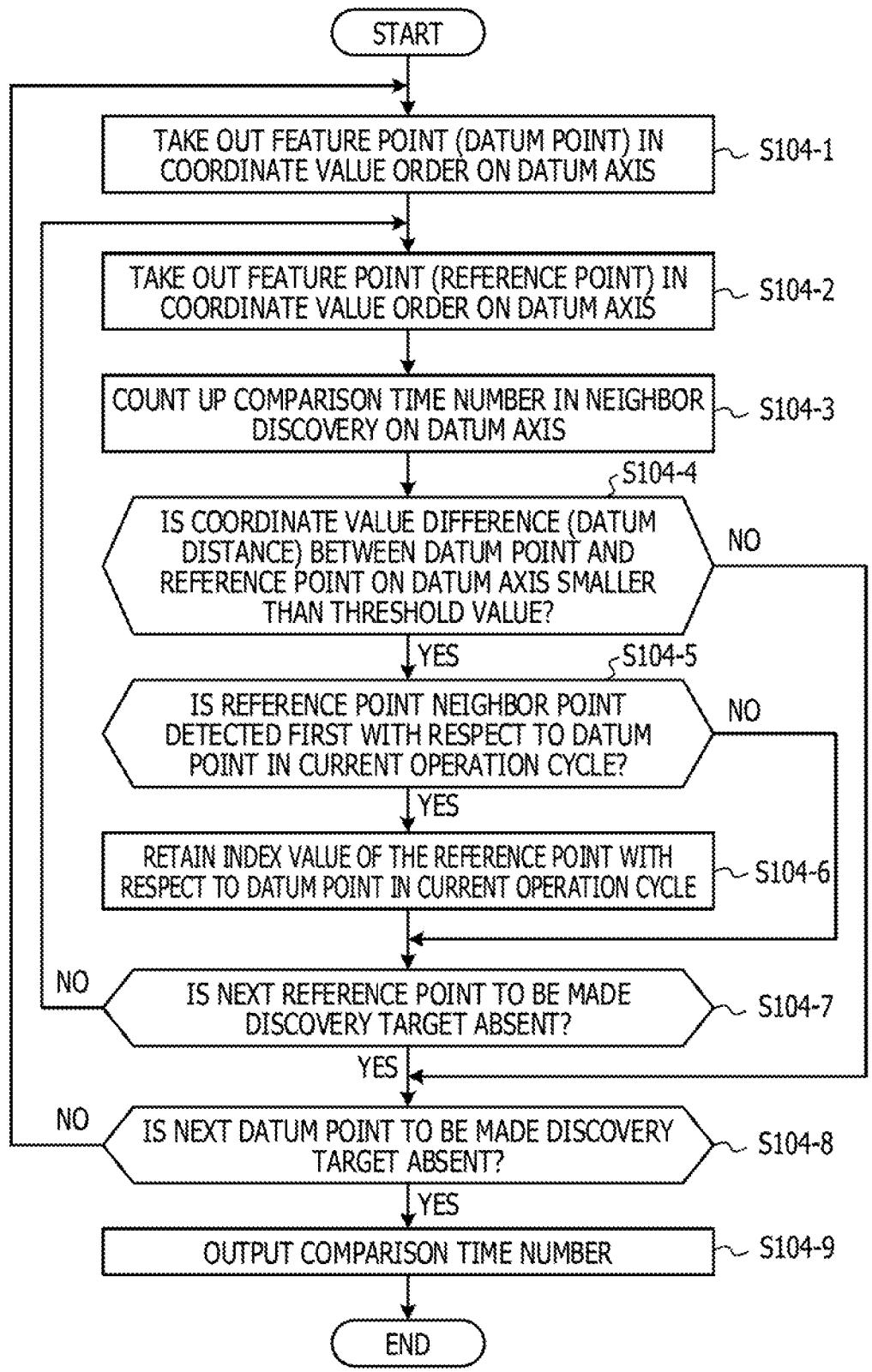
FIG. 7 is a flow chart illustrating an example of a counting process of a comparison time number in neighbor discovery.

FIG. 7 is a flow chart illustrating a counting process of a comparison time number in neighbor discovery. The counting process illustrated by reference to FIG. 7 may be the counting process S104 depicted in FIG. 2. In FIG. 7, an example of processes when attention is paid to one datum axis in the process S104 is illustrated. For example, where there are two first feature point groups including a first feature point group ordered using the X axis as a datum axis and another first feature point group ordered using the Y axis as a datum axis, in FIG. 7, processes for one first feature point group ordered using one of the X axis and the Y axis as a datum axis are exemplified. Further, it is assumed that, when the processes exemplified in FIG. 7 are executed, the processor 1 has two index values including an index value indicative of a reference position when one of a plurality of feature points included in the first feature point group is referred to as a datum point (datum point index value) and another index value indicative of a reference position when one of the plurality of feature points included in the first feature point group is referred to as a reference point. In the following description, to "take out a feature point" signifies to refer to one of one or more feature points ordered in the coordinate value order on a datum axis, and it is assumed that, even after a process for "taking out a feature point" is performed, this does not have an influence on the number of feature points included in the first feature point group. For example, in the following description, to "take out a feature point" has the same meaning as to "refer to a feature point."

The processor 1 takes out one feature point (datum point) in the coordinate value order (for example, in the ascending order) on the datum axis from within a first feature point group ordered in the coordinate value order on a certain datum axis (S104-1) and takes out one feature point (reference point) in the coordinate value order (for example, in the ascending order) on the datum axis (S104-2). It is to be noted that, when a reference point for the first time is taken out by the process S104-2 with respect to a certain datum point, the reference point index value may be set to the first number or to an index value a reference point detected as a neighbor point first in neighbor discovery on the datum axis with respect to the datum point in the preceding operation cycle. In the latter case, since the target of neighbor discovery on the datum axis with respect to the datum point in the present operation cycle may be limited using a result of neighbor discovery with respect to the datum point in the preceding operation cycle, the efficiency in neighbor discovery may be improved further. This is because, since the datum point in the preceding operation cycle and the datum point in the current operation cycle are feature points, which neighbor with each other, ordered in the coordinate value order on the datum axis, the datum distance of a reference point that appears prior to a reference point detected as a neighbor point first in neighbor discovery on the datum axis with respect to the datum point in the preceding operation cycle (for example, a reference point whose datum distance from the datum point in the preceding operation cycle is equal to or greater than a threshold value) from the datum point in the current operation cycle is equal to or greater than the threshold value for neighbor discovery and therefore need not be used as a comparison target in the neighbor discovery. It is to be noted that the datum distance has an aspect as a difference in coordinate value on the datum axis between the datum point and the reference point. For example, where the X axis is the datum axis, the datum distance is indicated by a difference between the X coordinate value of the datum point and the X coordinate value of the reference point.

The processor 1 counts up the comparison time number in neighbor discovery on the datum axis by one (S104-3). Then, the processor 1 determines whether or not the difference in coordinate value (also referred to as datum distance) on the datum axis between the datum point and the reference point is smaller than the threshold value for neighbor discovery (S104-4). If the datum distance is smaller than the threshold value for neighbor discovery (YES at S104-4), the processor 1 determines the reference point as a neighbor point with the datum point in the current operation cycle and determines whether or not the reference point is a neighbor point detected first with respect to the datum point in the current operation cycle (S104-5). If the reference point is a neighbor point detected first with respect to the datum point in the current operation cycle (YES at S104-5), the processor 1 stores (retains) an index value of the reference point with respect to the datum point in the current operation cycle (such index value is referred to also as reference point index value) as an index value of the reference point that is taken out first in neighbor discovery with respect to a datum point in the next operation cycle (S104-6). On the other hand, if the reference point is a neighbor point detected for the second time or later with respect to the datum point in the current operation cycle (NO at S104-5), the processor 1 may skip the process S104-6 without executing the same.

The processor 1 determines whether or not a next reference point to be made a discovery target is absent (S104-7). For example, if the reference point index value reaches the number of feature points included in the first feature point group, the processor 1 may determine that a next reference point to be made a discovery target is absent. If a next point to be made a discovery target is absent (YES at S104-7), the processor 1 ends the process for neighbor discovery on the datum axis with respect to the datum point in the current operation cycle. Consequently, the comparison time number for the datum point in the current operation cycle is finally determined. Then, the processor 1 determines whether or not process for neighbor discovery with respect to a next datum point may be started (S104-8). For example, by the process S104-8, the processor 1 determines whether or not a next datum point to be made a discovery target is absent. For example, if the datum point index value reaches the number of feature points included in the first feature point group, the processor 1 may determine that a next datum point to be made a discovery target is absent. If a next datum point to be made a discovery target is absent (YES at S104-8), the processor 1 outputs one comparison time number as a simulation result (result of execution of the process S104) of neighbor discovery for the first feature point group on a certain one datum axis (S104-9). For example, if a next datum point to be made a discovery target is absent (YES at S104-8), the processor 1 acquires (calculates) a total value of the comparison time number counted for the datum points on the certain one datum axis (S104-9).

If it is determined in the determination of the process S104-4 that the datum distance is equal to or greater than the threshold value for neighbor discovery (NO in S104-4), the processor 1 ends the process for neighbor discovery with respect to the datum point in the current operation cycle. Consequently, the comparison time number for the datum point in the current operation cycle is finally determined. Then, the processor 1 executes the processes beginning with the process S104-8 described hereinabove. Even if the determination by the process S104-4 reveals that the reference point index value at present is a value lower than the number of feature points included in the first feature point group, the processor 1 may end the process for neighbor discovery with respect to the datum point in the current operation cycle, and the efficiency in neighbor discovery may be improved. This is because, since a reference point in the current operation cycle and a next reference point are ordered in the coordinate value order on the datum axis, when the datum distance to the reference point in the current operation cycle is equal to or greater than the threshold value, the datum distance to the next reference point is greater than the threshold value for neighbor discovery and the reference point in the current operation cycle may not be made a target for neighbor discovery.

If it is determined in the determination in the process S104-7 that a next reference point to be made a discovery target is present (NO at S104-7), the processor 1 executes the processes beginning with S104-2. Thereupon, the reference point index value is counted up, for example, by one such that a next reference point may be taken out in the coordinate value order on the datum axis from within the first feature point group.

If it is determined in the determination in the process S104-8 that a next datum point to be made a discovery target is present (No at S104-8), the processor 1 executes the processes beginning with S104-1. Thereupon, the datum point index value is counted up, for example, by one such that a next datum point may be taken out in the coordinate value order on the datum axis from within the first feature point group. Further, the reference point index value may be set to the number at the first position (for example, the first number) or may be set using a value of the reference point index value retained by the process S104-6 as described hereinabove.

Figure 8:
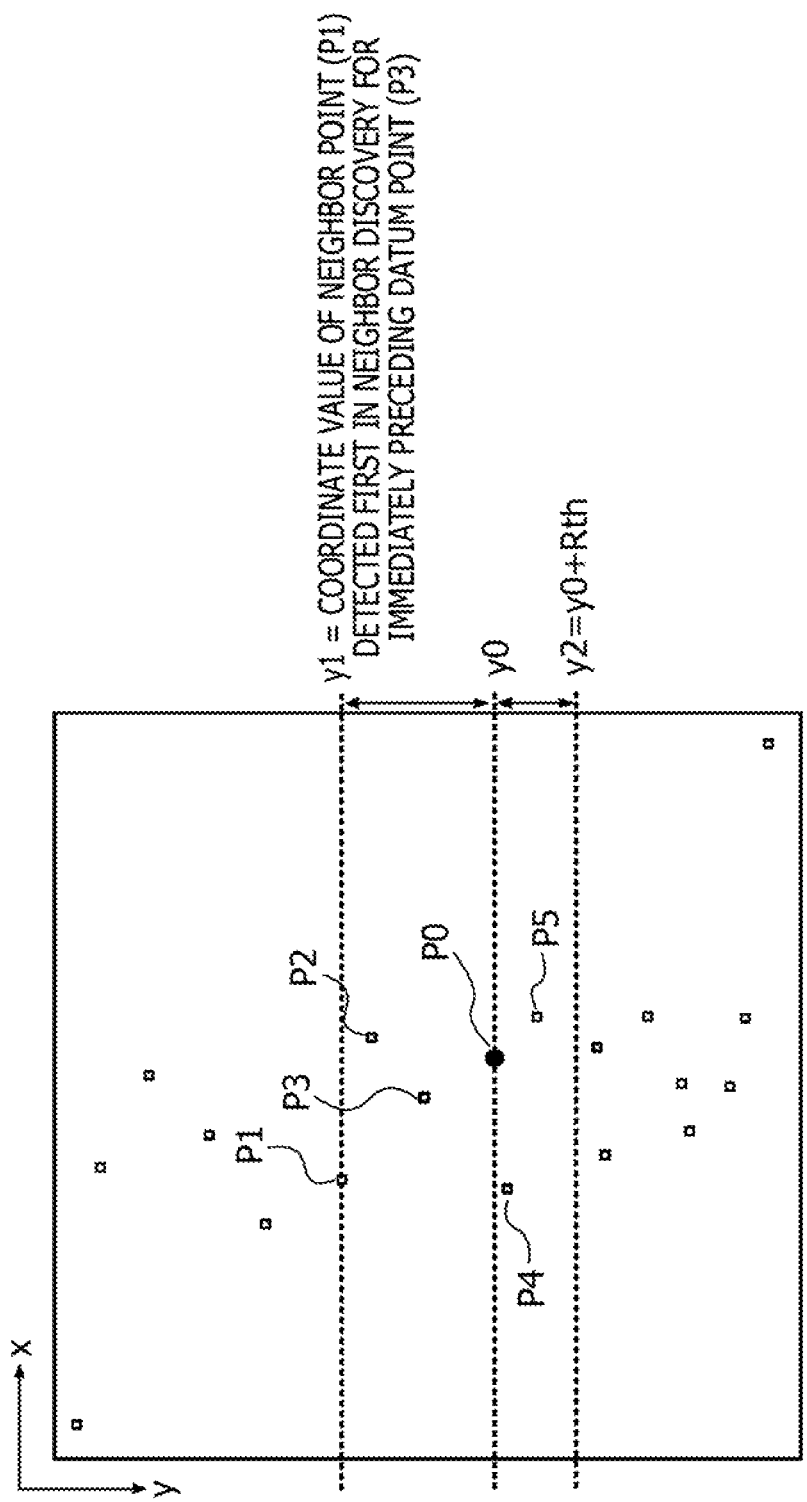
FIG. 8 is a view illustrating an example of neighbor discovery where a datum axis is a Y axis.

The foregoing is an example of the counting process S104 of the comparison time number in neighbor discovery illustrated in FIG. 7. The flow of the processes illustrated in FIG. 7 is executed for each axis that may become a datum axis. For example, where two axes including the X axis and the Y axis are available as the axes that may be made a datum axis, the flow of the processes illustrated in FIG. 7 is executed for each of the X axis and the Y axis. For example, the process S104 in which the X axis is used as the datum axis and the process S104 in which the Y axis is used as the datum axis are executed. As a result, a comparison time number as an execution result of the process S104 (for example, the process S104-1 to the process S104-9) where the X axis is used as the datum axis and a comparison time number as an execution result of the process S104 (for example, the process S104-1 to the process S104-9) where the Y axis is used as the datum axis are obtained. FIG. 8 is a view illustrating an example of neighbor discovery with respect to a datum point where a datum axis is set to a Y axis. In the example of FIG. 8, six reference points P0, P1, P2, P3, P4, and P5 are depicted within a range defined by an upper limit value y1 and a lower limit value y2 for neighbor discovery including y0 that is a coordinate value on the datum axis of the datum point P0 in the current operation cycle. The upper limit value y1 is, for example, a coordinate value on the datum axis of a reference point detected first as a neighbor point in the neighbor discovery with respect to the datum point in the preceding operation cycle. The lower limit value y2 is a coordinate value obtained by adding a threshold value Rth for neighbor discovery to the coordinate value y0 on the datum axis of the datum point P0 in the current operation cycle. It is to be noted that the point P0 of FIG. 8 is the reference point P0 and may become also the reference point P0.

Figure 9:
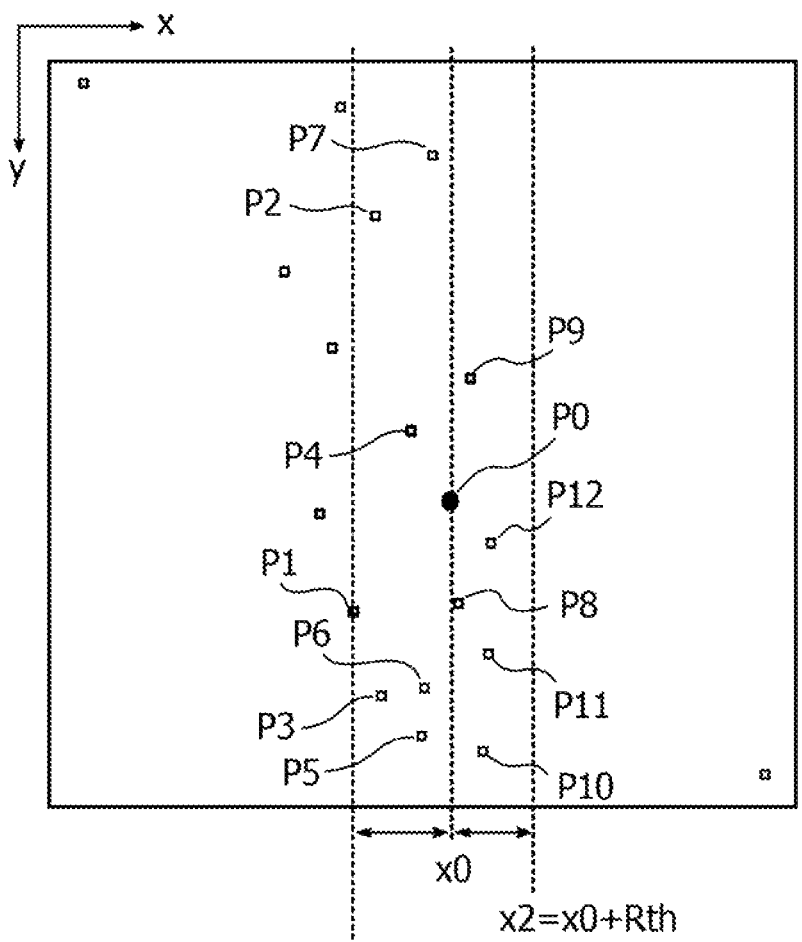
FIG. 9 is a view illustrating an example of neighbor discovery where a datum axis is an X axis.

FIG. 9 is a view illustrating an example of neighbor discovery with respect to a datum point where a datum axis is set to the X axis in a distribution of feature points same as that of FIG. 8. In the example of FIG. 9, 13 reference points P0, P1, P2, P3, P4, P5, P6, P7, P8, P9, P10, P11, and P12 are depicted within a range defined by an upper limit value x1 and a lower limit value x2 for neighbor discovery including x0 that is a coordinate value on the datum axis of the datum point P0 in the current operation cycle. The upper limit value x1 is, for example, a coordinate value on the datum axis of a reference point detected first as a neighbor point by the neighbor discovery with respect to the datum point in the preceding operation cycle. The lower limit value x2 is a coordinate value obtained by adding the threshold value Rth for neighbor discovery to the coordinate value x0 on the datum axis of the datum point P0 in the current operation cycle. It is to be noted that the point P0 in FIG. 9 is also a datum point P0 and may become also a reference point P0. It is recognized that in comparison with the example of FIG. 8, in the example of FIG. 9, the number of comparison targets in neighbor discovery where the X axis is used as the datum axis is great and therefore the X axis is not an optimum datum axis. The number of comparison targets in neighbor discovery is associated with the comparison time number obtained by the process S104. For example, in the example of FIGS. 8 and 9, the comparison time number as an execution result of the process S104 (for example, the process S104-1 to the process S104-9) where the datum axis is the X axis is greater than the comparison time number where the datum axis is the Y axis.

Now, referring back to FIG. 2, processes beginning with the process S105 are described. After a comparison time number of neighbor discovery for all datum axes is obtained by process S104, for example, after m comparison time numbers in the m-dimensional space are obtained, the processor 1 selects a datum axis for which the comparison time number in neighbor discovery is small as an optimum datum axis (S105).

Figure 10:
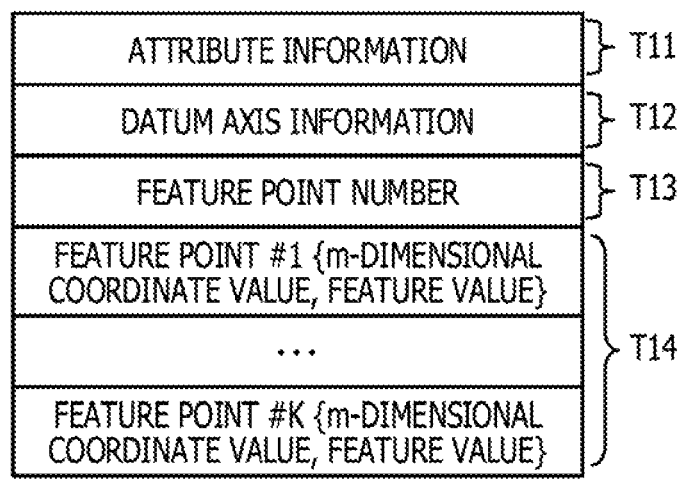
FIG. 10 is a view illustrating an example of registration data.

The processor 1 stores the first feature point group ordered with the selected datum axis in association with information relating to the selected datum axis s registration data into the registration data DB 22 (S106). FIG. 10 is a view illustrating an example of registration data. In the example of FIG. 10, the registration data include attribute information T11 indicative of a user ID or the like of a subject (user) from whom a biological image is provided, datum axis information T12 having information relating a datum axis selected as an optimum datum axis, a feature point number T13 indicative of the number of feature points included in a first feature point group, and a first feature point group T14 having one or more feature points ordered in the coordinate value order on the selected datum axis. For example, in the process S106, the processor 1 generates registration data including attribute information T11 indicative of a user ID or the like of a subject (user) from whom a biological image is provided datum axis information T12 having information relating to a selected datum axis, a feature point number T13 indicative of the number of feature points included in a first feature point group, and a first feature point group T14 having one or more feature points ordered in the coordinate value order on the selected datum axis, and stores the registration data into the registration data DB 22. It is assumed that each of the one or more feature points includes a coordinate value (m-dimensional coordinate value) in the m-dimensional space and a feature value indicative of a characteristic of a pixel around the coordinate value. It is to be noted that the feature value is a value obtained from pixels around the coordinate value using a known algorithm as described hereinabove. It is to be noted that the processor 1 may acquire the attribute information T11 indicative of a user ID or the like of a subject (user) from whom a biological image is provided from the inputting device 4 or the like.

Figure 11:
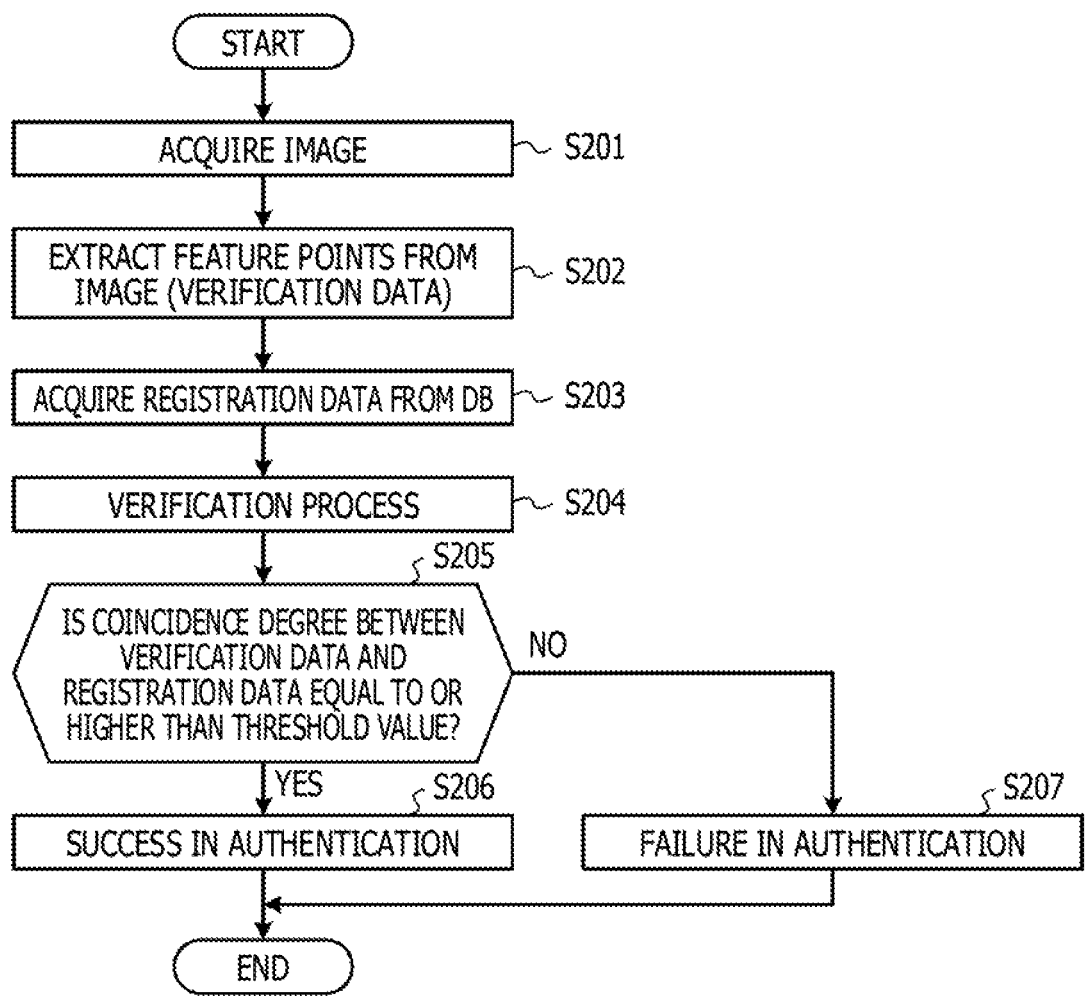
FIG. 11 is a flow chart illustrating an example of processes in an authentication mode implemented by an authentication processing unit in the working example 1.

The foregoing is an example of the registration process according to the working example 1. Now, an example of an authentication process according to the working example 1 is described. FIG. 11 is a flow chart illustrating an example of processes in an authentication mode implemented by an authentication processing unit in the working example 1. The authentication processing unit illustrated by reference to FIG. 11 may be the authentication processing unit 213 depicted in FIG. 1. It is to be noted that some of the processes illustrated in FIG. 11 are implemented by the datum axis selection unit 214 in the present working example. Execution of the processes illustrated in FIG. 11 may be started, for example, using it as a trigger that the authentication mode is selected based on an input signal from the inputting device 4 by the mode selection unit 211.

The processor 1 acquires a biological image obtained by image pickup of a living body part (for example, a palm, a finger or the like) of a subject (user) who is to be authenticated from the biological sensor 5 (S201).

The processor 1 acquires one or more feature points (second feature point group) used as verification data in the authentication process from the biological image (S202). Each of the feature points of the second feature point group has a coordinate value in an m-dimensional (m=natural number equal to or greater than 2) and a feature value similarly to the first feature point group. As the method for extracting one or more feature points used for authentication from within the biological image, a known method similar to that used in the process S102 illustrated in FIG. 2 may be used. It is to be noted that, in the process S202 or prior to the process S202, a normalization process for the biological image may be performed. Affine transformation such as expansion, reduction, rotation, or parallel translation for pixels in a subject region may be performed using the shape of the entirety or part of the subject region on the biological image to perform positioning such that the subject region is positioned within a given range of the image.

The processor 1 acquires registration data used in the authentication process from the registration data DB 22 (S203). In the process S203, the processor 1 may receive attribute information such as a user ID of a subject (user) to be authenticated from the inputting device 4 or the like and acquire registration data having the attribute information T11 coincident with the inputted attribute information from the registration data DB 22.

The processor 1 performs a verification process between the verification data and the registration data to calculate a verification score indicative of a coincidence degree between the verification data and the registration data (S204). As described hereinabove in connection with the registration process in the foregoing description, there is a problem that, depending upon which axis is selected as a datum axis for neighbor discovery, the efficiency in neighbor discovery on the datum axis may possibly decrease. Therefore, in the process S204 in the present working example, the datum axis selection unit 214 performs a process for determining each of the coordinate axes that define an m-dimensional space as a datum axis, performing simulation of neighbor discovery on each datum axis using the feature point group ordered in the coordinate value order on the datum axis, counting the number of feature points (comparison time number) that are made a comparison target in the neighbor discovery on the datum axis, and selecting the datum axis of the feature point group on which the comparison time number is small as an optimum datum axis in the neighbor discovery.

Figure 12A:
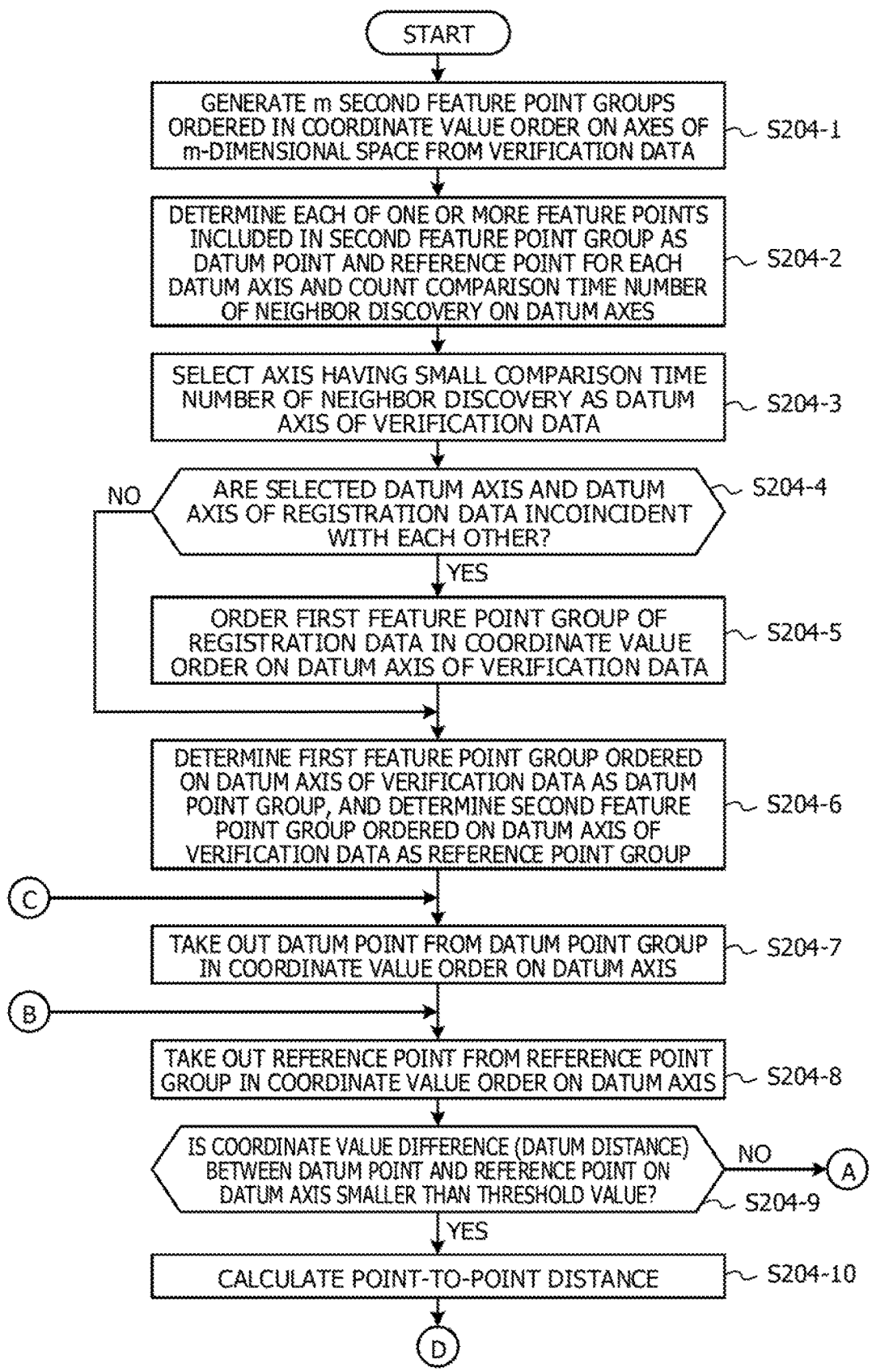
FIG. 12A is a flow chart illustrating an example of a verification process in an authentication mode.
Figure 12B:
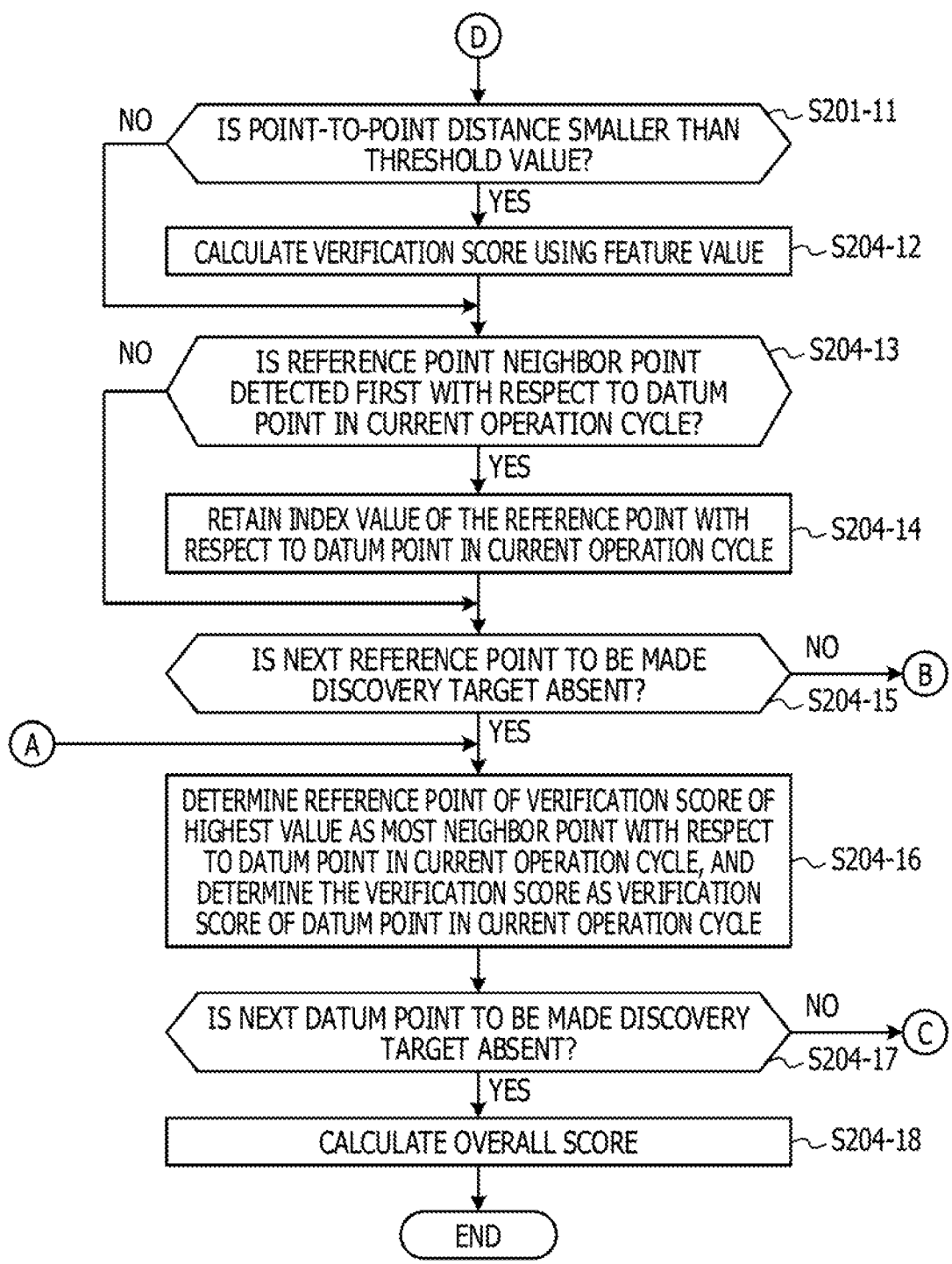
FIG. 12B is a flow chart illustrating an example of a verification process in an authentication mode.

FIG. 12 is a flow chart illustrating an example of a verification process in an authentication mode. The verification process illustrated by reference to FIG. 12 may be the verification process S204 depicted in FIG. 11. In the flow of the verification process S204 exemplified in FIG. 12, processes, for example, from a process S204-1 to a process S204-3 are an example of processes by the datum axis selection unit 214.

The processor 1 generates, from the verification data acquired by the process S202, m feature point groups (second feature point groups) in which each of the coordinate axes that define the m-dimensional space is determined as a datum axis and which are ordered in the coordinate value order on the datum axis (S204-1). For example, in the case of feature points projected to a two-dimensional space, a second feature point group in which feature points are ordered in the coordinate value order on the X axis and another second feature point group in which feature points are ordered in the coordinate value order on the Y axis are generated. It is to be noted that, where, as a scanning direction of pixels when feature points are extracted from a biological image in the process S202, the X axis is determined as a main scanning direction and the Y axis is determined as a sub scanning direction, one or more feature points extracted from a biological image are placed into a state in which they are ordered in the coordinate value order on the Y axis that is the sub scanning direction. Therefore, the processor 1 may treat the one or more feature points extracted from the biological image as a second feature point group in which they are ordered in the coordinate value order on the Y axis. In this case, by performing only a process for ordering the feature points in the coordinate value order on the X axis that is an axis different from the sub scanning direction, two second feature point groups ordered in the coordinate value order on the datum axis where each of the coordinate axes that define the m-dimensional space is set as the datum axis may be acquired.

The processor 1 determines, for the second feature point group ordered in the coordinate value order on each datum axis, each of one or more feature points included in the second feature point group as a datum point and a reference point and counts the number of feature points (comparison time number) that become a comparison target in neighbor discovery on the datum axis (S204-2). It is to be noted that a particular example of the process S204-2 is similar to the process example illustrated in FIG. 7, and therefore, detailed description of the particular example is omitted herein.

After a comparison time number of neighbor discovery is obtained with regard to all datum axes by the process S204-2, for example, after m comparison time numbers in the m-dimensional space are obtained, the processor 1 selects the datum axis on which the comparison time number of neighbor discovery is small as an optimum datum axis to the verification data (second feature point group) (S204-3).

The processor 1 compares the datum axis of the verification data and the datum axis indicated by the datum axis information of the registration data with each other to determine whether or not the datum axis of the variation data and the datum axis of the registration data are incoincident with each other (S204-4). If the datum axis of the verification data and the datum axis of the registration data are incoincident with each other (YES in S204-4), the processor 1 orders the first feature point group of the registration data in the coordinate value order on the datum axis of the verification data (S204-5). On the other hand, if the datum axis of the verification data and the datum axis of some registration data coincide with each other (NO in S204-4), the processor 1 may skip the process S204-5 without executing the same. It is to be noted that, if the subject (user) of the biological image used for generation of the registration data is a person same as the subject (user) of the biological image used for generation of the verification data, the first feature point groups of the registration data may be distributed substantially same manner as that of second feature point groups of the verification data in the m-dimensional space. Therefore, when the subject (user) of the registration data and the subject (user) of the verification data are the same person, the possibility is high that the datum axis of the verification data selected by the process S204-1 to the process S204-3 may coincide with the datum axis indicated by the datum axis information of the registration data and the process S204-5 need not be executed. Accordingly, where the subject (user) of the registration data and the subject (user) of the verification data are the same person, since the process S204-5 may not be executed, the response speed in neighbor discovery may be improved as much. For example, since, upon execution of the registration process of the registration data, the datum axis selection unit 214 performs simulation of neighbor discovery using the registration data (first feature point groups) and first feature point groups each ordered in the coordinate value order on an optimum datum axis are obtained, execution of the process S204-5 in the authentication process may be omitted.

The processor 1 continues the process illustrated in FIG. 12 determining the first feature point group ordered on the datum axis of the verification data as the datum point group and determining the second feature point group ordered on the datum axis of the verification data as the reference point group (S204-6). It is to be noted that, in the following description relating to the processes of FIG. 12, the "datum axis of verification data" is referred to as datum axis. To "take out a feature point" signifies to refer to one of the one or more feature points ordered in the coordinate value order on a datum axis, and it is assumed that, even after a process for "taking out a feature point" is performed, this does not have an influence on the number of feature points included in the feature point group referred to. For example, in the following description, to "take out a feature point" has the same meaning as to "refer to a feature point." Further, it is assumed that, when the processor 1 executes the processes exemplified in FIG. 12, the processor 1 has two index values including an index value to be used to refer to a datum point group (datum point index value) and an index value to be used to refer to a reference point of a reference point group (reference point index value).

The processor 1 takes out a datum point from the datum point group in the coordinate value order (for example, in the ascending order) on the datum axis (S204-7) and takes out a reference point from the reference point group in the coordinate value order (for example, in the ascending order) on the datum axis (S204-8). It is to be noted that, when a reference point is taken out for the first time with respect to a certain datum point in the process S204-8, the reference point index value may be set to the first number (for example, to 1), or an index value of a reference point detected as a neighbor point first in neighbor discovery on the datum axis with respect to a datum point in the preceding operation cycle may be set. In the latter case, since the target of neighbor discovery on the datum axis with respect to the datum point in the current operation cycle may be restricted using a result of the neighbor discovery with respect to the datum point in the preceding operation cycle, the efficiency in neighbor discovery may be improved further. This is because, since the datum point in the preceding operation cycle and the datum point in the current operation cycle are feature points, which neighbor with each other, ordered in the coordinate value order on the datum axis, the datum distance of a reference point that appears prior to a reference point detected as a neighbor point first in neighbor discovery on the datum axis with respect to the datum point in the preceding operation cycle (for example, a reference point whose datum distance from the datum point in the preceding operation cycle is equal to or greater than a threshold value) from the datum point in the current operation cycle is equal to or greater than the threshold value for neighbor discovery and therefore need not be used as a comparison target in the neighbor discovery. Consequently, the efficiency in neighbor discovery may be further improved.

The processor 1 determines whether or not the difference (datum distance) in coordinate value between the datum point and the reference point on the datum axis is smaller than the threshold value for neighbor discovery (S204-9). If the datum distance is smaller than the threshold value for neighbor discovery (YES in S204-9), the processor 1 detects the reference point as a neighbor point with respect to the datum point in the current operation cycle and calculates the point-to-point distance between the neighbor point and the datum point (S204-10). It is to be noted that, for the point-to-point distance, various distance concepts such as the Euclidean distance, Manhattan distance and so forth may be used.

The processor 1 determines whether or not the point-to-point distance between the neighbor point and the datum point is smaller than the threshold value for neighbor discovery (S204-11), and if the point-to-point distance between the neighbor point and the datum point is smaller than the threshold value for neighbor discovery (YES in S204-11), the processor 1 calculates a verification score using the feature value of the reference point detected as the neighbor point and the feature value of the datum point (S204-12). It is to be noted that, as the verification score, a correlation value of a feature value that is a result of correlation arithmetic operation performed using the feature value, a Hamming distance between feature values represented in a bit sequence and so forth may be used. On the other hand, if the point-to-point distance between the neighbor point and the datum point is equal to or greater than the threshold value for neighbor discovery (NO in S204-11), the processor 1 skips the process S204-12 without executing the same. For example, in the present working example, a reference point whose point-to-point distance is equal to or greater than the threshold value for neighbor discovery is not determined as a calculation target of a verification score even if the datum distance is smaller than the threshold value. However, the present embodiment is not limited to this example, and as a modification, the process S204-10 and the process S204-11 may be omitted such that all reference points whose point-to-point distance is smaller than the threshold value for neighbor discovery are included in the calculation target of a verification score. According to the modification, since the processes (S204-10 and S204-11) relating to the point-to-point distance are omitted, the response speed in neighbor discovery may be improved as much.

The processor 1 determines whether or not the reference point whose datum distance is determined to be smaller than the threshold value by the determination process in the process S204-9 is a neighbor point detected first with respect to the datum point in the current operation cycle (S204-13). If the reference point is a neighbor point detected first (YES in S204-13), the processor 1 stores (retains) an index value (reference point index value) of the neighbor point (reference point) with respect to the datum point in the current operation cycle as an index value to a reference point to be taken out first in neighbor discovery with respect to the datum point in the next operation cycle (S204-14). On the other hand, if the reference point is a neighbor point detected for the second or later time with respect to the datum point in the current operation cycle (NO in S204-13), the processor 1 may skip the process S204-14 without executing the same.

The processor 1 determines whether or not a next reference point to be made a discovery target is absent (S204-15). For example, if the reference point index value reaches the number of feature points (reference points) included in the reference point group, the processor 1 may determine that a next reference point to be made a discovery target is absent. If a next reference point to be made a discovery target is absent (YES in S204-15), the processor 1 ends the processes for neighbor discovery on the datum axis with respect to the datum point in the current operation cycle, and determines a reference point of a verification score of the highest value as a most neighbor point with respect to the datum point in the current operation cycle (the most neighbor point is sometimes referred to as corresponding point to the datum point) and determines the verification score as a verification score to the datum point in the current operation cycle (S204-16). On the other hand, if it is determined in the process S204-15 that a next reference point to be made a discovery target is present (NO in S204-15), the processor 1 executes the processes beginning with S204-8. Thereupon, the reference point index value is counted up, for example, by one such that a next reference point may be taken out in the coordinate value order on the datum axis from the reference point group.

The processor 1 determines whether or not the process for neighbor discovery with respect to a next datum point is to be continued (S204-17). For example, in the process S204-17, the processor 1 determines whether or not a next datum point to be made a discovery target is absent. For example, if the datum point index value reaches the number of feature points (datum points) included in the datum point group, the processor 1 may determine that a next datum point to be made a discovery target is absent. If a next datum point to be made a discovery target is absent (YES in S204-17), the processor 1 calculates an overall score using one or more verification scores acquired by execution of the process S204-16 for each of the one or more datum points (S204-18). The processor 1 may determine, as the overall score, a value obtained, for example, by ordering one or more verification scores in the descending order of the score value, selecting a given number of verification scores from the top (for example, 10 top verification scores), and performing various statistical processes using the selected given number of verification scores. For example, the processor 1 may determine an average value or a median of the selected given number of verification scores as the overall score.

If it is determined in the process S204-17 that a next datum point to be made a discovery target is present (NO in S204-17), the processor 1 executes the processes beginning with S204-7. Thereupon, the datum point index value is counted up, for example, by one such that a next datum point may be taken out in the coordinate value order on the datum axis from the datum point group. Further, the reference point index value may be set to the top number (for example, to the first) or may be set using a value of the reference point index value retained by the process S204-14.

If it is determined by the process S204-9 that the datum distance is equal to or greater than the threshold value for neighbor discovery (NO in S204-9), the processor 1 ends the process for neighbor discovery with respect to the datum point in the current operation cycle and executes the processes beginning with the process S204-16 described hereinabove. Consequently, even if the reference point index value at present is a value lower than the number of feature points (reference points) included in the reference point group, the process for neighbor discovery with respect to the datum point in the current datum point may be ended, and the efficiency in neighbor discovery may be improved further. This is because, since a reference point in the current operation cycle and a next reference point are ordered in the coordinate value order on the datum axis, when the datum distance to the reference point in the current operation cycle is equal to or greater than the threshold value, the datum distance also to the next reference point is equal to or greater than the threshold value and the reference point in the next operation cycle may not be made a target for neighbor discovery.

The foregoing is an example of the verification process S204 illustrated in FIG. 12. Now, referring back to FIG. 11, description of the process S205 is continued. The processor 1 compares the overall score acquired by the process S204 with the threshold value for authentication to determine a degree of coincidence between the verification data and the registration data (S205). If the overall score is equal to or higher than the threshold value for authentication (YES in S205), the processor 1 determines that the verification data and the registration data coincide with each other and outputs an authentication result indicative of success in authentication (S206). For example, the processor 1 may output the authentication result indicative of success in authentication to the display device 3. For example, the processor 1 may output the authentication result indicative of success in authentication to the locking controlling device 6.

On the other hand, if the overall score is lower than the threshold value for authentication in the process S205 (NO in S205), the processor 1 determines that the verification data and the registration data do not coincide with each other and outputs an authentication result indicative of failure in authentication (S207). For example, the processor 1 may output the authentication result indicative of failure in authentication to the display device 3. For example, the processor 1 may output the authentication result indicative of failure in authentication to the locking controlling device 6.

The foregoing is an example of the processes in the authentication mode implemented by the authentication processing unit 213 in the working example 1. In the description given above, the description of the processes illustrated in FIGS. 11 and 12 is given focusing on an authentication process (verification process) between one verification data and one registration data. However, it is not to be interpreted that the working example 1 is limited to this but may be applied, for example, also to "1:N authentication" in which an authentication process (verification process) between one verification data and a plurality of registration data is performed. Where 1:N authentication is performed, the processor 1 may acquire, for example, totaling N registration data from the registration data DB 22 in the process S203 illustrated in FIG. 11. In this regard, the processor 1 may acquire N registration data by single time execution of the process S203. Alternatively, the processor 1 may loop the processes beginning with the process S203 for one registration data to acquire totaling N registration data. Alternatively, the process S203 for acquiring registration data from the registration data DB 22 may not be executed between the process S202 and the process S204 illustrated in FIG. 11 but may be executed between the process S204-3 and the process S204-4 illustrated in FIG. 12. In this case, every time one registration data is acquired from the registration data DB 22 in the process S203, the series process of the processes S204-4 to S204-18 and the processes S205 to S207 may be executed to implement 1:N authentication. Thereupon, an authentication process (verification process) between all of the N registration data and the verification data may be performed, or at the point of time at which an authentication result of success in authentication is obtained, the authentication process (verification process) of the loop by N times may be ended without acquiring succeeding registration data from the registration data DB 22 and then an authentication result of success in authentication may be conveyed to the locking controlling device 6. Alternatively, upon 1:N authentication, every time a result of an authentication process (verification process) of one registration data with the verification data is obtained, the authentication result may not be conveyed to the locking controlling device 6. For example, if all N authentication results obtained by an authentication process executed by N times using N registration data all result in failure in authentication, a single authentication result indicative of failure in authentication may be conveyed to the locking controlling device 6. Alternatively, if N authentication results obtained by an authentication process performed by N times using N registration data include N−1 authentication failures and one authentication success, the processor 1 may convey one authentication result indicative of success in authentication to the locking controlling device 6.

According to the working example 1 described above, since an axis on which the comparison time number in neighbor discovery is small may be selected as a datum axis by performing simulation of neighbor discovery, the response speed of feature point verification may be increased while the verification accuracy of feature points is maintained. The authentication system 100 to which such a verification process of feature points is applied may improve the response speed of an authentication process while degradation of the authentication accuracy is suppressed. It is to be noted that the authentication system 100 is an example of a system to which the verification process according to the working example 1 is applied. As another example of a system to which the verification process according to the working example 1 is applied, a character recognition system, an object detection system and so forth may be listed. By applying the verification process according to the working example 1 to such application systems, for example, it is possible to increase the response speed in character recognition while the recognition accuracy is maintained or to raise the response speed in object detection while the detection accuracy is maintained.

Working Example 2

Now, a working example 2 is described. In an authentication system 100 according to the working example 2, a technique for improving the response speed of an authentication process where an optimum datum axis is different between registration data and verification data is introduced. For example, in one aspect of the authentication system 100 according to the working example 2, the working example 2 is different from the working example 1 in that a result of ordering in the coordinate value order using each of coordinate axes that define an m-dimensional space as a datum axis is retained in registration data stored in the registration data DB 22. Consequently, in the working example 2, the response speed of an authentication process where a subject (user) of verification data and a subject (user) of registration data are different from each other is improved. For example, in the working example 2, even if the datum axis of verification data and the datum axis of registration data in an authentication process are incoincident with each other, first feature point groups of the registration data may not be re-ordered into those in the coordinate value order on the datum axes of the verification data. Therefore, the process S204-5 that is executed when the datum axis of verification data and the datum axis of registration data are incoincident with each other in the verification process according to the working example 1 illustrated in FIG. 12 may be omitted. Consequently, while the verification accuracy of feature points is maintained, the response speed in feature point verification may be increased. The authentication system 100 to which such a verification process of feature points as just described is applied may improve the response speed of an authentication process while degradation of the authentication accuracy is suppressed.

Figure 13:
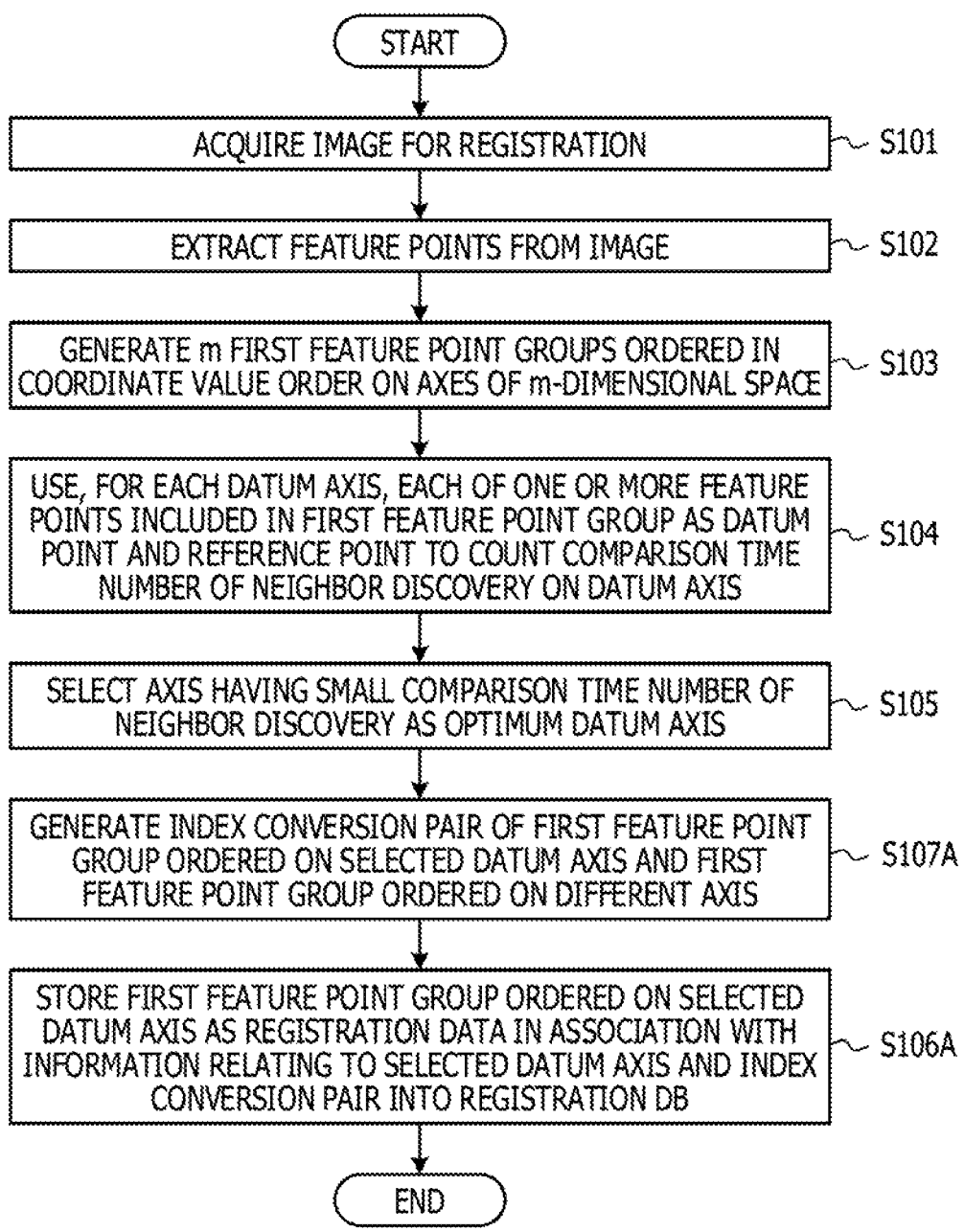
FIG. 13 is a flow chart illustrating an example of processes in a registration mode implemented by a registration processing unit according to a working example 2.

FIG. 13 is a flow chart illustrating an example of processes in a registration mode implemented by a registration processing unit in the working example 2. The registration processing unit illustrated by reference to FIG. 13 may be the registration processing unit 212 depicted in FIG. 1. Some of the processes illustrated in FIG. 13 are implemented by the datum axis selection unit 214 similarly as in the working example 1. For example, the process S103 to the process S105 correspond to the processes by the datum axis selection unit 214. Execution of the processes illustrated in FIG. 13 may be started taking it as a trigger that the registration mode is selected based on an input signal from the inputting device 4 by the mode selection unit 211. It is to be noted that the process S101 to the process S105 from among the processes illustrated in FIG. 13 may have similar process contents to those in the working example 1, and therefore, description of them is omitted herein.

After a datum axis (datum axis for registration data) optimum to the registration data is selected by the datum axis selection unit 214, the processor 1 compares a first feature point group ordered on the selected datum axis and another first feature point group ordered on an axis different from the selected datum axis to generate an index conversion pair table having index conversion pairs paring index values of corresponding feature points (S107A). For example, the processor 1 generates, in the process S107A, an index conversion pair for converting an ordering result of the first feature point group ordered on the coordinate axis different from the datum axis for registration data and an ordering result of the first feature point group ordered on the datum axis for registration data. In the process S107A, the processor 1 may determine feature points of the same coordinate value as corresponding feature points. Where a plurality of feature points whose coordinate values are same as each other exist, the corresponding feature points may be restricted using a condition that the feature values are same in addition to the condition that the coordinate values are same.

Figure 14:
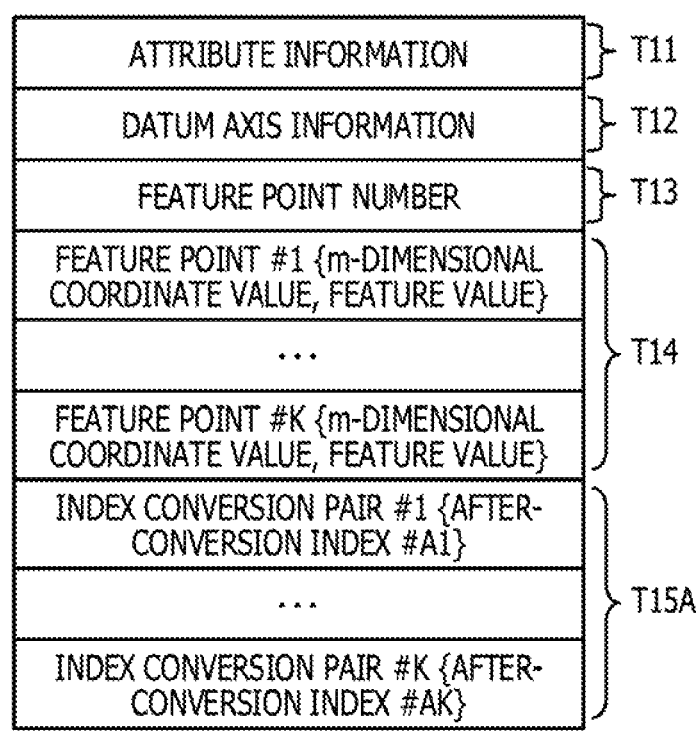
FIG. 14 is a view illustrating an example of registration data (m=2) according to the working example 2.

The processor 1 generates registration data including attribute information indicative of a user ID or the like of the subject (user) from whom the biological image for registration data is provided, the first feature point group ordered on the datum axis for registration data, the feature point number representative of the number of feature points included in the first feature point group, the information relating to the datum axis for registration data (datum axis information), and the index conversion pair table, and stores the generated registration data into the registration data DB 22 (S106A). FIG. 14 is a view illustrating an example of registration data (m=2) in the working example 2. The registration data exemplified in FIG. 14 are different from the example of the registration data in the working example 1 illustrated in FIG. 10 in that an index conversion pair table T15A is added but is same in the other points. The index conversion pair table T15A has the number of index conversion pairs (index conversion pair #1 to index conversion pair # K) substantially equal to the number indicated by the feature point number T13. In the example of FIG. 14, the index conversion pairs are ordered in the index value order table of the first feature point group ordered on an axis different from the datum axis for registration data in the index conversion pair table. For example, in the example illustrated in FIG. 14, index values of the first feature point group ordered on an axis different from the datum axis for registration data are represented (retained) in an order of the index conversion pairs in the index conversion pair table. For example, the index conversion pair #1 stored first is a conversion pair relating to a feature point (feature point of the index value=1) stored first in the first feature point group ordered on the axis different from the datum axis for registration data. In the example illustrated in FIG. 14, each index conversion pair has an index value (after-conversion index) at which a corresponding feature point is positioned in the first feature point group ordered on the datum axis for registration data. Accordingly, when the processor 1 generates a conversion pair of an index value of a feature point stored first in the first feature point group ordered on the axis different from the datum axis for registration data and an index value of a corresponding feature point in the first feature point group ordered on the datum axis for registration data, the processor 1 may store the index value (after-conversion index) of the corresponding feature point in the first feature point group ordered on the datum axis for registration data as an index conversion pair into the first position in the index conversion pair table.

FIG. 15 is a view illustrating an example of registration data (m=3) in the working example 2. For example, in the example of FIG. 15, since a feature point has a coordinate value in a three-dimensional space, there are three ordering results where each of the coordinate axes that define the three-dimensional space is used as a datum axis. One of the ordering results is retained as a first feature point group T14 ordered on a selected datum axis into registration data. The two remaining ordering results are retained as index conversion pair tables T15A and T16A into the registration data. For example, registration data in the working example 2 may retain, for a feature point projected to the m-dimensional space, one first feature point group and m−1 index conversion pair tables. It is to be noted that, when a plurality of index conversion pair tables are stored into a registration table, an order may be determined for the coordinate axes of the m-dimensional space in advance such that an order in which the index conversion pair tables are stored into the registration table is determined in accordance with the determined order. For example, in the case of a three-dimensional space, an order may be determined such that the X axis is the first, the Y axis is the second, and the Z axis is the third, and when an index conversion pair table is stored for the Y axis and the Z axis, the index conversion pair tables may be stored such that the index conversion pair table for the Y axis is stored first and the index conversion pair table for the Z axis is stored second. In the example described above, where an index conversion pair table is stored for the X axis and the Z axis, the index conversion pair tables may be stored such that the index conversion pair table for the X axis is stored first and the index conversion pair table for the Z axis is stored second. Further, where an index conversion pair table is stored for the X axis and the Y axis, the index conversion pair tables may be stored such that the index conversion pair table for the X axis is stored first and the index conversion pair table for the Y axis is stored second. Also in a verification process of a feature point in the authentication mode, if a rule same as this rule is applied, a corresponding index conversion pair table may be selected.

Figure 16A:
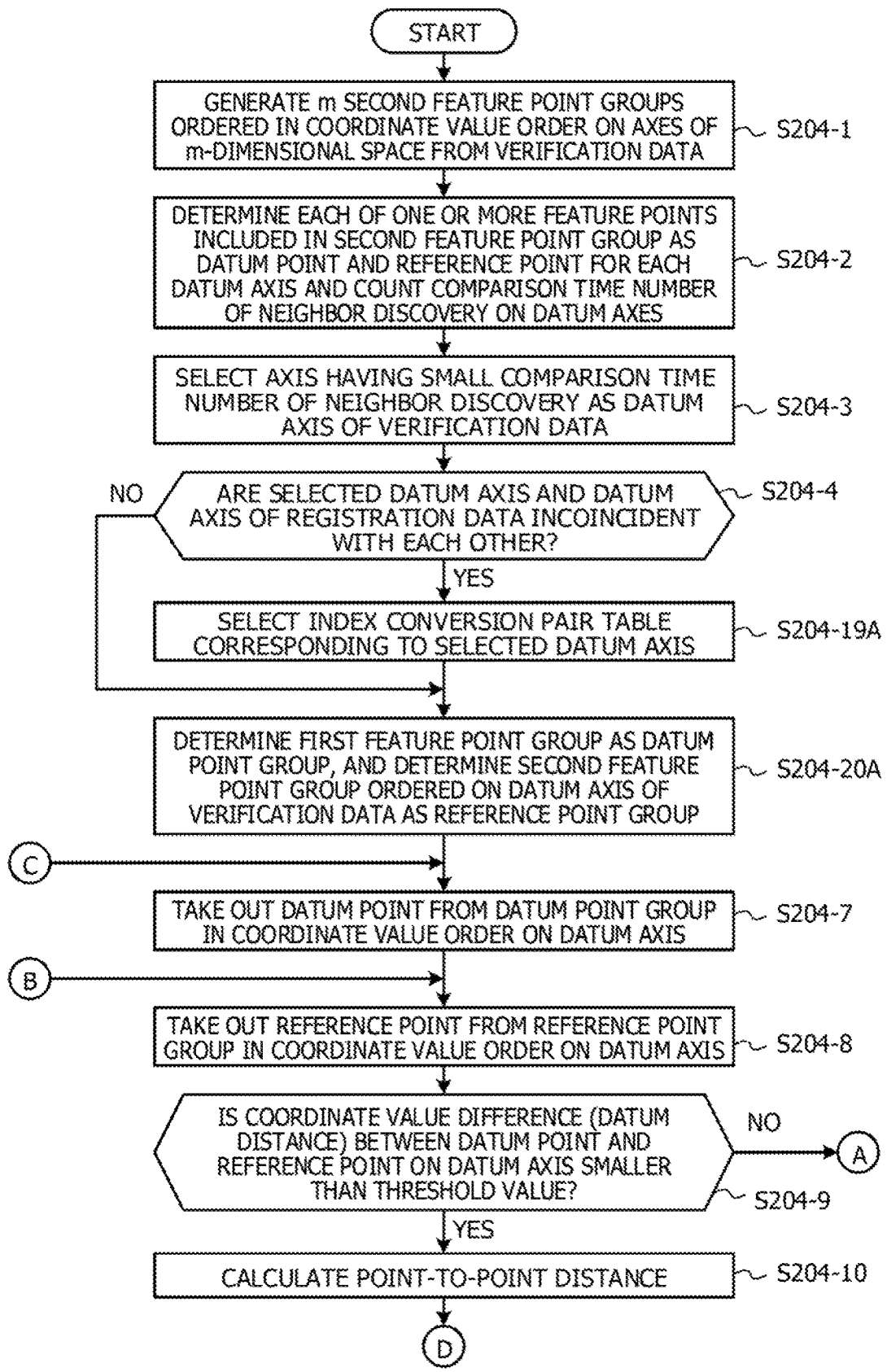
FIG. 16A is a flow chart illustrating an example of a verification process of feature points in an authentication mode implemented by an authentication processing unit in the working example 2.
Figure 16B:
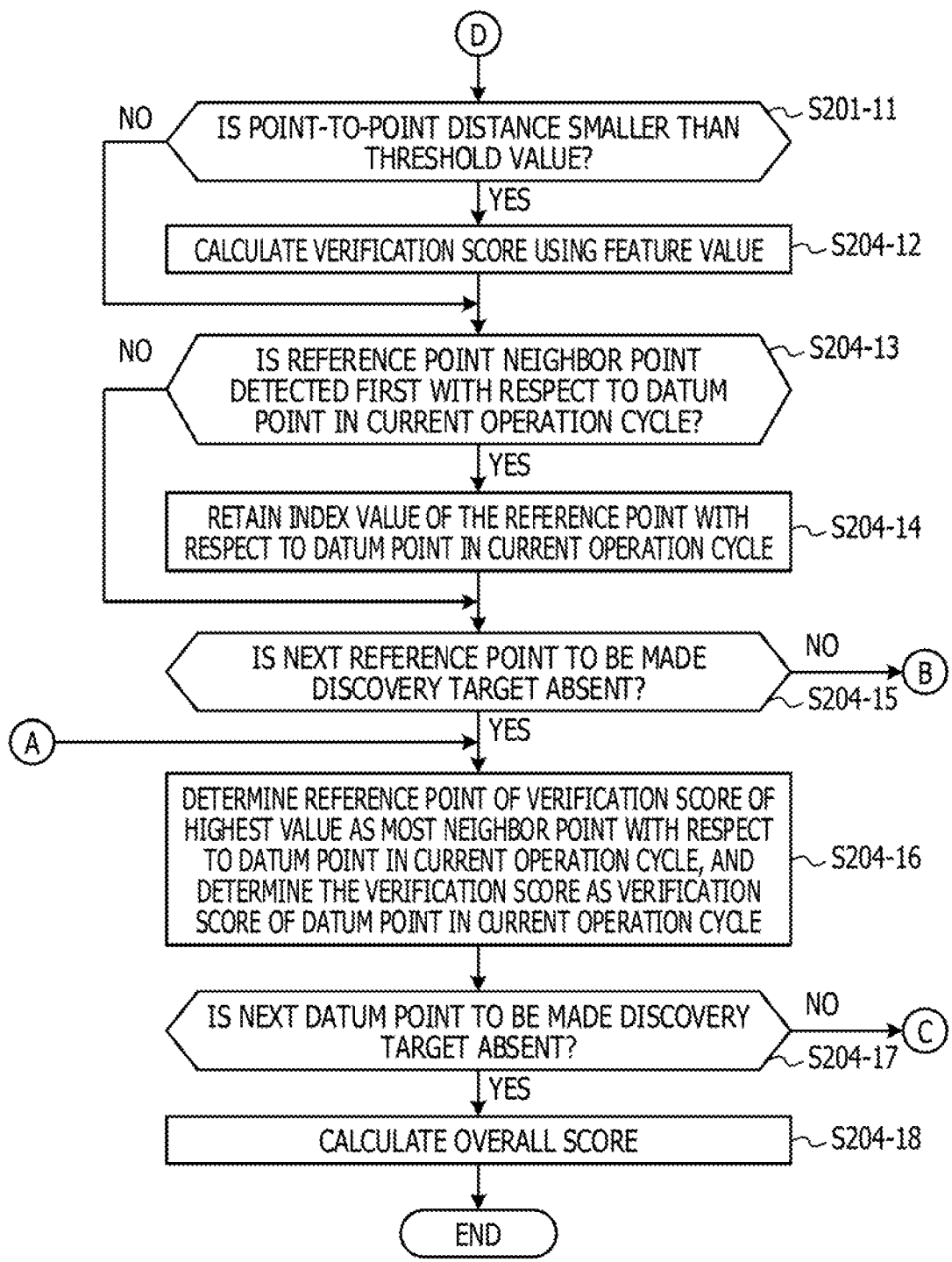
FIG. 16B is a flow chart illustrating an example of a verification process of feature points in an authentication mode implemented by an authentication processing unit in the working example 2.

The foregoing is an example of the registration process in the working example 2. Now, an authentication process in the working example 2 is described. FIG. 16 is a flow chart illustrating an example of a verification process of a feature point in an authentication mode implemented by an authentication processing unit in the working example 2. The authentication processing unit illustrated by reference to FIG. 16 may be the authentication processing unit 213 depicted in FIG. 1. The verification process illustrated in FIG. 16 is different from the verification process in the working example 1 illustrated in FIG. 12 in that, for example, the process 204-5 is rewritten into a process S204-19A and the process S204-6 is rewritten into a process S204-20A. A process S204-1 to a process S204-3 illustrated in FIG. 16 may be processes similar to those in the process example of the working example 1 illustrated in FIG. 12, and therefore, description of them is omitted herein. Further, upon 1:N authentication, the process S203 for acquiring registration data from the registration data DB 22 may be executed between the process S204-3 and the process S204-4. For example, 1:N authentication may be implemented by executing, every time one registration data is acquired from the registration data DB 22 by the process S203, a series of processes of the processes S204-4 to S204-18, processes S204-19A and S204-20A, and processes S205 to S207.

If the processor 1 determines that the selected datum axis and the datum axis of the registration data are incoincident with each other in the process S204-4 (YES in S204-4), the processor 1 selects an index conversion pair table corresponding to the selected datum axis from among the index conversion pair tables stored in the registration data (S204-19A). The selection method of a corresponding index conversion pair table may be such as described in the description of the registration process in the working example 2. On the other hand, if it is determined that the selected datum axis and the datum axis of the registration data are coincident with each other (NO in S204-4), the processor 1 may skip the process S204-19A omitting execution of the same.

The processor 1 determines the first feature point group ordered on an axis same as the datum axis of the verification data as a datum point group and determines the second feature point group ordered on the datum axis of the verification data as a reference point group and then continues the succeeding processes (S204-20A). For example, if the selected datum axis and the datum axis of the registration data are incoincident with each other, the processor 1 may use, as the first feature point group ordered on the axis same as the datum axis of the verification data, the first feature point group that mediates a conversion pair (index conversion pair table) ordered on the datum axis of the verification data. On the other hand, if the selected datum axis and the datum axis of the registration data are coincident with each other, the processor 1 may use, as the first feature point group ordered on the axis same as the datum axis of the verification data, the first feature point group T14 set in the registration data. The processor 1 may use, as the conversion pair ordered on the datum axis of the verification data, the index conversion pair table selected by the process S204-19A. Where, in the processes beginning with the process S204-7, the first feature point group that mediates an index conversion pair table is used as the datum point group, when the processor 1 takes out the datum point in the coordinate value order on the datum axis selected at the process S204-3 from within the datum point group, the processor 1 may take out, after converting the datum point index value into an after-conversion index using the selected index conversion pair table, feature points (datum points) using the after-conversion index. Consequently, even where the datum axis of the verification data and the datum axis of the registration data are different from each other, the first feature point group of the registration data may not be re-ordered on the datum axis of the verification data. For example, where the datum axis of the verification data and the datum axis of the registration data are different from each other, even if the first feature point group of the registration data is not re-ordered on the datum axis of the verification data, increase of the arithmetic operation cost in the verification process of feature points may be suppressed and the response speed of the feature point verification may be increased while the verification accuracy of feature points is maintained. The authentication system 100 to which such a verification process as just described is applied may improve the response speed of an authentication process while degradation of the authentication accuracy is suppressed.

The foregoing is description of the processes in the working example 2. It is to be noted that, since the configuration example of the authentication system 100 according to the working example 2 may be similar to the configuration example depicted in FIG. 1, description of the configuration is omitted herein. According to the working example 2 described above, even if, in "1:N authentication" for performing verification of one verification data with a plurality of registration data, a combination of the datum axis of some registration data and the datum axis of verification data which are incoincident with each other appears, the response speed in feature point verification may be increased while the verification accuracy of feature points is maintained. The authentication system 100 to which such a verification process as just described is applied may suppress increase of the arithmetic operation cost in an authentication process while degradation of the authentication accuracy is suppressed, and may significantly improve the response speed of an authentication process in 1:N authentication. It is to be noted that the authentication system 100 described above is an example of a system to which the verification process according to the working example 2 is applied. As another example of a system to which the verification process according to the working example 2 is applied, a character recognition system, an object detection system and so forth may be listed. By applying the verification process according to the working example 2 to such application systems, for example, it is possible to increase the response speed in character recognition while the recognition accuracy is maintained or to raise the response speed in object detection while the detection accuracy is maintained.

Working Example 3

Now, a working example 3 is described. In an authentication system 100 according to the working example 3, an alternative proposal of a technique for improving the response speed of an authentication process where an optimum datum axis is different between registration data and verification data is introduced. For example, in an aspect of the authentication system 100 according to the working example 3, the working example 3 is different from the working example 1 and the working example 2 in that a concept of a system datum axis shared by all registration data stored in the registration data DB 22 of the authentication system 100 is newly added. According to the working example 3, information relating to a datum axis and a feature point number are collected from one or more registration data stored in the registration data DB 22, and the feature point number is totaled for each of the datum axes indicated by the collected information. Then, a datum axis having a sufficiently high ratio to the total number of the collected feature point numbers may be selected as a system datum axis. For example, the processor 1 in the working example 3 is configured such that it selects, as a system datum axis, a datum axis that has, from among feature point numbers for individual datum axes, a feature point number that indicates a maximum ratio to the total number when feature point numbers for individual datum axes are totaled and that has feature point numbers whose ratio is equal to or higher than a given value. Then, a process for re-ordering each first feature point group of registration data ordered on a datum axis different from the selected datum axis in the coordinate value order on the system datum axis may be executed, for example, at a timing different the timing at which an authentication process is executed. From those, in the working example 3, it is possible to raise the probability that the datum axes of verification data and registration data may coincide with each other and to raise the response speed in feature point verification while the verification accuracy of feature points is maintained. The authentication system 100 to which such a verification process as described above is applied may improve the response speed of an authentication process while degradation of the authentication accuracy is suppressed.

Figure 17:
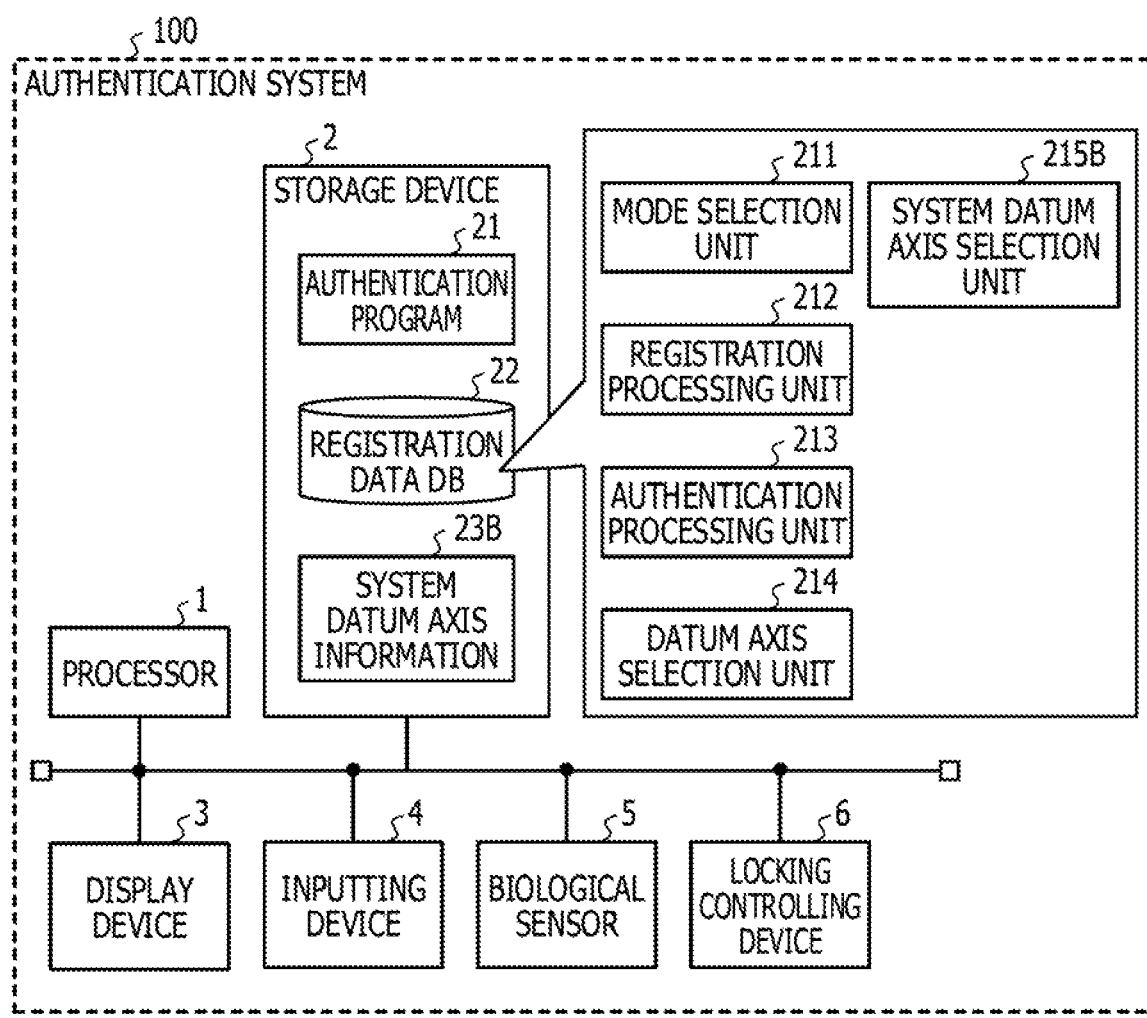
FIG. 17 is a block diagram depicting an example of a configuration of an authentication system according to a working example 3.

FIG. 17 is a block diagram depicting an example of a configuration of an authentication system according to the working example 3. In one aspect of an authentication system 100 according to the working example 3, the configuration example of the authentication system 100 is different from the configuration example of the working example 1 depicted in FIG. 1 in that a system datum axis selection unit 215B is added to the authentication program 21 stored in the storage device 2. Further, in the aspect of the authentication system 100 according to the working example 3 depicted in FIG. 17, the configuration example of the authentication system 100 is different from the configuration example of the working example 1 depicted in FIG. 1 in that the storage device 2 stores system datum axis information 23B. Since the configuration of the other part may be similar to the configuration of the working example 1 or the working example 2, description of the configuration is omitted herein. In the following, processes implemented by the system datum axis selection unit 215B are described.

Figure 18:
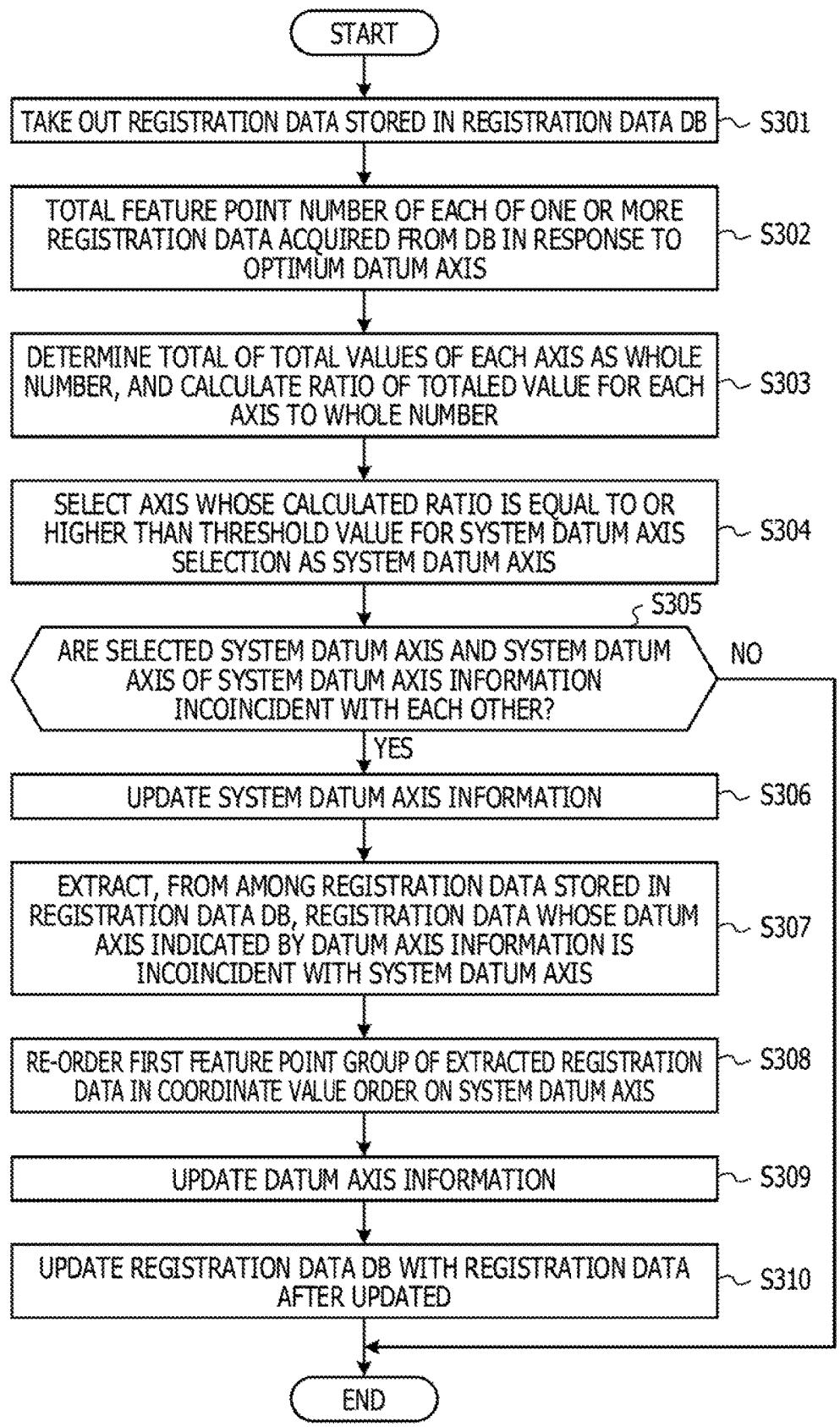
FIG. 18 is a flow chart illustrating an example of processes implemented by a system datum axis selection unit in the working example 3.

FIG. 18 is a flow chart illustrating an example of processes implemented by a system datum axis selection unit in the working example 3. The system datum axis selection unit illustrated by reference to FIG. 18 may be the system datum axis selection unit 215B depicted in FIG. 17. Execution of the processes illustrated in FIG. 18 is started at an arbitrary timing different from a timing at which an authentication process is executed. For example, the processor 1 may start execution of the processes illustrated in FIG. 18 taking it as a trigger that new registration data is stored into the registration data DB 22 by a registration process. For example, the processor 1 may start execution of the processes illustrated in FIG. 18 taking lapse of time as a trigger. The processor 1 may start execution of the process illustrated in FIG. 18 at intervals of a given period of time such as one day or one month. The processor 1 may start execution of the processes illustrated in FIG. 18 taking it as a trigger that an arbitrary calendar schedule such as the third Sunday of every month comes. For example, the processor 1 may start execution of the processes illustrated in FIG. 18 at an arbitrary timing within a time zone within which the authentication system 100 is not operated by the user.

Figure 19:
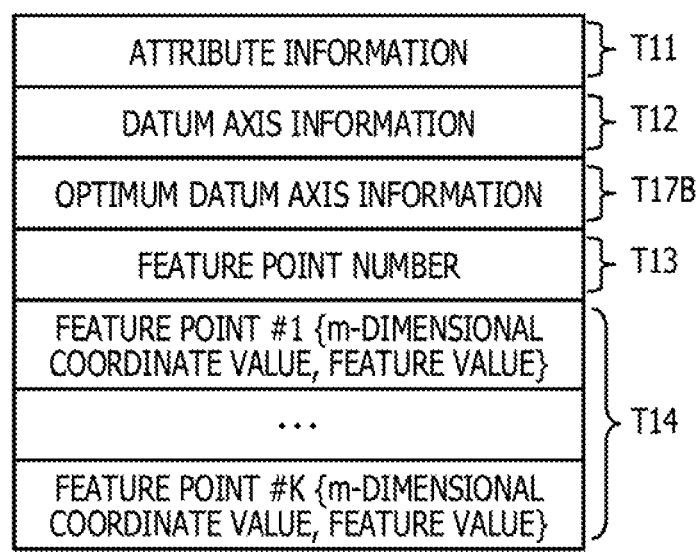
FIG. 19 is a view illustrating an example of registration data (m=2) according to the working example 3.

The processor 1 takes out the registration data stored in the registration data DB 22 (S301). FIG. 19 is a view illustrating an example of registration data (m=2) in the working example 3. In the example illustrated in FIG. 19, the example of the registration data is different from the example of the registration data in the working example 1 illustrated in FIG. 10 in that optimum datum axis information T17B is added. For example, in the registration process (S106) implemented by the registration processing unit 212 in the working example 3, the processor 1 may store registration data that includes the optimum datum axis information T17B provided additionally as depicted in FIG. 19 into the registration data DB 22. To the optimum datum axis information T17B information relating to an optimum datum axis selected by a process (for example, S105) of the datum axis selection unit 214 is set. To the datum axis information T12, information relating to a datum axis used in ordering of feature points of the first feature point group T14 is set. For example, where the first feature point group T14 is ordered in the coordinate value order on the X axis, information indicating that the X axis is a datum axis is set to the datum axis information T12. It is to be noted that a particular example of the registration process in the working example 3 is hereinafter described.

Then, the processor 1 totals the feature point number T13 of each of one or more registration data acquired from the registration data DB 22 in response to the datum axis indicated by the optimum datum axis information T17B (S302). For example, where each of the one or more registration data acquired from the registration data DB 22 has feature points projected to the two-dimensional space defined by the X axis and the Y axis, the processor 1 totals the feature point number T13 of the registration data whose optimum datum axis information T17B indicates the X axis and totals the feature point number T13 of the registration data whose optimum datum axis information T17B indicates the Y axis.

The processor 1 determines the total of the total values of the datum axes as a whole number and calculates a ratio of the totaled value for each datum axis to the whole number (S303) and selects a datum axis with regard to which the calculated ratio is equal to or higher than a threshold value for system datum axis selection as a system datum axis (S304). The threshold value for system datum axis selection is a value that may be adjusted suitably in response to an operation situation of the authentication system 100, and some value (real number), for example, within a range from 0.8 to 1.0 may be used as a sufficiently high ratio. As a modification, for example, where feature points projected to a two-dimensional space defined by the X axis and the Y axis are treated, the processor 1 may calculate the ratio for one of the datum axes and determines whether or not the ratio calculated for the one datum axis is equal to or higher than the threshold value for system datum axis selection described above. Then, if it is determined that the ratio is lower than the threshold value system datum axis selection, the processor 1 may compare a second threshold value for system datum axis selection which indicates a sufficiently low ratio (for example, some value (real number) within a range from 0.0 to 0.2) and the calculated ratio with each other and select, if the calculated ratio is equal to or lower than the second threshold value, another datum axis with regard to which the ratio is not calculated as a system datum axis. As another modification, the processor 1 may calculate a ratio of the feature point number on a datum axis different from the system datum axis indicated by the system datum axis information 23B stored in the storage device 2. Then, the processor 1 compares the calculated ratio and the threshold value for system datum axis selection described above with each other and selects a datum axis with regard to which the calculated ratio is equal to or higher than the threshold value for system datum axis selection as a system datum axis. According to the modification, a system datum axis indicated by the system datum axis information 23B may be maintained until the ratio of a feature point number on a different datum axis becomes a sufficiently high ratio.

Then, the processor 1 refers to the system datum axis information 23B from the storage device 2 to determine whether or not the system datum axis indicated by the system datum axis information 23B and the system datum axis selected by the process S304 are incoincident with each other (S305). If it is determined that the system datum axis indicated by the system datum axis information 23B and the selected system datum axis are incoincident with each other (YES in S305), the processor 1 updates the system datum axis information 23B in the storage device 2 using the information relating to the system datum axis selected by the process S304 (S306). On the other hand, if the system datum axis indicated by the system datum axis information 23B and the selected system datum axis are coincident with each other (NO in S305), the processor 1 may skip the process S306 to the process S310 without executing them and end the process illustrated in FIG. 18.

The processor 1 extracts, from the registration data stored in the registration data DB 22, registration data whose datum axis indicated by the datum axis information T12 does not coincide with the system datum axis selected by the process S304 (S307). Then, the processor 1 re-orders the first feature point group T14 of the extracted registration data in the coordinate value order on the system datum axis (S308). Consequently, the first feature point group T14 of the registration data becomes a feature point group that has one or more feature points ordered in the coordinate value order on the system datum axis.

The processor 1 updates the datum axis information of the extracted registration data using the information relating to the system datum axis selected by the process S304 (S309). Then, the processor 1 updates the registration data in the registration data DB 22 using the registration data having the values after updated (S310). By the processes described above, the first feature point group T14 of the registration data stored in the registration data DB 22 is placed into a state in which it is ordered in the coordinate value order on the system datum axis selected by the process S304. Consequently, in one aspect of the authentication system 100 according to the working example 3, the probability that the datum axis of registration data may coincide with the datum axis of verification data in an authentication process may be raised. For example, if it is assumed that verification data inputted to the authentication system 100 coincides with some of one or more registration data stored in the authentication system 100, the ratio of datum axes of the inputted verification data may be considered substantially equal to the ratio of the datum axes of the registration data registered in the authentication system 100. Therefore, by ordering the feature points of the registration data using the system datum axis selected in response to a ratio obtained by totaling of the registered registration data, the probability that the datum axis of the verification data inputted upon authentication and the datum axis of the registration data may coincide with each other may be increased. Consequently, while the verification accuracy of feature points is maintained, the response speed in feature point verification may be increased. The authentication system 100 to which such a verification process as just described is applied may improve the response speed of an authentication process while degradation of the authentication accuracy is suppressed.

Figure 20:
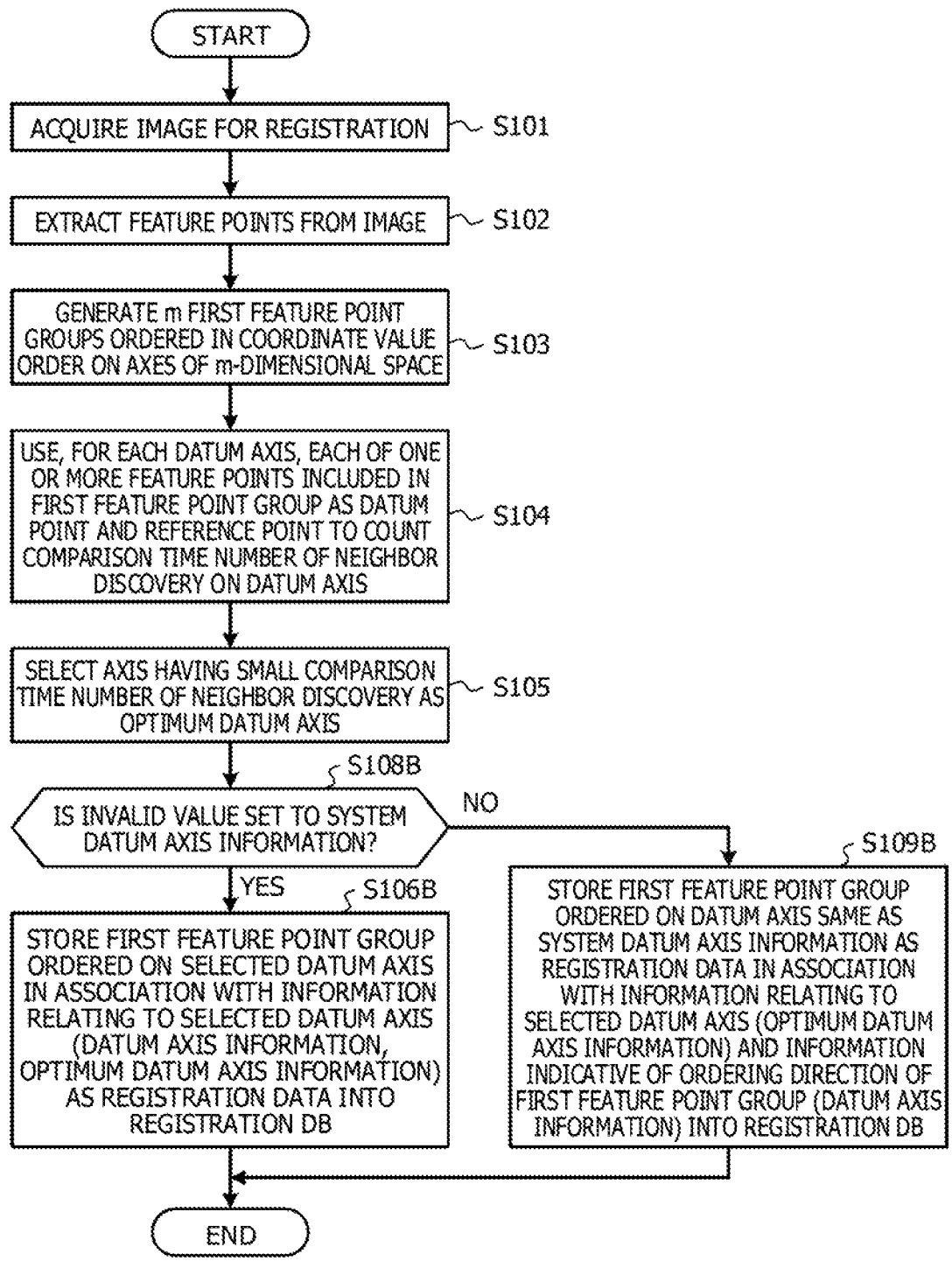
FIG. 20 is a flow chart illustrating an example of a registration process implemented by a registration processing unit in the working example 3.

Now, a registration process implemented by the registration processing unit 212 in the working example 3 is described. FIG. 20 is a flow chart illustrating an example of the registration process implemented by the registration processing unit 212 in the working example 3. Some of the processes illustrated in FIG. 20 are implemented by the datum axis selection unit 214 similarly as in the working example 1. For example, the process S103 to the process S105 correspond to processes by the datum axis selection unit 214. Execution of the processes illustrated in FIG. 20 may be started taking it as a trigger that, for example, the mode selection unit 211 selects the registration mode based on an input signal from the inputting device 4. It is to be noted that the process S102 to the process S105 from among the processes illustrated in FIG. 20 may have similar process contents to those in the working example 1 illustrated in FIG. 2, and therefore, description of them is omitted herein.

After a datum axis optimum to registration data (datum axis for registration data) is selected by the datum axis selection unit 214, the processor 1 refers to the system datum axis information 23B stored in the storage device 2 determine whether or not an invalid value is set to the system datum axis information 23B (S108B). For example, if a null value is set to the system datum axis information 23B, the processor 1 may determine that an invalid value is set. For example, if the null value is not set to the system datum axis information 23B, the processor 1 may determine that an invalid value is not set to the system datum axis information 23B. Further, if the value of the system datum axis information 23B is set to a value that does not correspond to any of the m datum axes that define the m-dimensional space, the processor 1 may determine that an invalid value is set to the system datum axis information 23B. For example, when the value of the system datum axis information 23B is set to a value indicative of one of the m datum axes that define the m-dimensional space, the processor 1 may determine that an invalid value is not set to the system datum axis information 23B.

If it is determined by the process S108B that an invalid value is set to the system datum axis information 23B (YES in S108B), the processor 1 generates registration data including attribute information T11 indicative of a user ID or the like of a subject (user) from whom a biological image for registration data is provided, a first feature point group T14 ordered on the datum axis for registration data, datum axis information T12 set using information relating a datum axis for registration data, optimum datum axis information T17B set using the information relating to the datum axis for registration data, and a feature point number T13 indicative of the number of one or more feature points included in a first feature point group, and stores the generated registration data into the registration data DB 22 (S106B), thereby ending the process illustrated in FIG. 20. For example, where an invalid value is set to the system datum axis information 23B, even if information relating to the datum axes of the registration data stored in the registration data DB 22 is totaled, also the ratio of any one of the m datum axes that define the m-dimensional space is not sufficiently high, and a system datum axis may not be set as yet. Therefore, where an invalid value is set to the system datum axis information 23B, a first feature point group ordered using the datum axis for registration data is set to the system datum axis information 23B, a first feature point group ordered using the datum axis for registration data is set to the registration data to suppress increase of the arithmetic operation cost for a verification process of feature points between verification data of the same subject (user) and registration data.

On the other hand, if it is determined by the process S108B that an invalid value is not set to the system datum axis information 23B (NO in S108B), the processor 1 generates registration data including attribute information T11 indicative of a user ID or the like of a subject (user) from whom a biological image for registration data is provided, a first feature point group T14 ordered on the datum axis same as the system datum axis information 23B, a feature point number T13 indicative of the number of one or more feature points included in the first feature point group, datum axis information T12 set using information indicative of an ordering direction of the first feature point group T14 (same datum axis as the system datum axis information 23B), and optimum datum axis information T17B set using information relating to the datum axis for registration data (datum axis selected by the process S105), and stores the generated registration data into the registration data DB 22 (S109B), thereby ending the process illustrated in FIG. 20.

The foregoing is description of the processes according to the working example 3. It is to be noted that, in the authentication system 100 according to the working example 3, since, for example, the processes by the authentication processing unit 213 (datum axis selection unit 214) may be similar to the processes in the process example of the working example 1 illustrated in FIGS. 11 and 12, description of the processes is omitted herein. According to the working example 3 described above, in "1:N authentication" for performing verification of one verification data with a plurality of registration data, the probability that the datum axes of the verification data and the registration data may coincide with each other may be increased. Consequently, the response speed in feature point verification may be increased while the verification accuracy of feature points is maintained. The authentication system 100 to which such a verification process as just described is applied may improve the response speed of an authentication process while degradation of the authentication accuracy is suppressed.

Modifications to Working Example 3

Figure 21A:
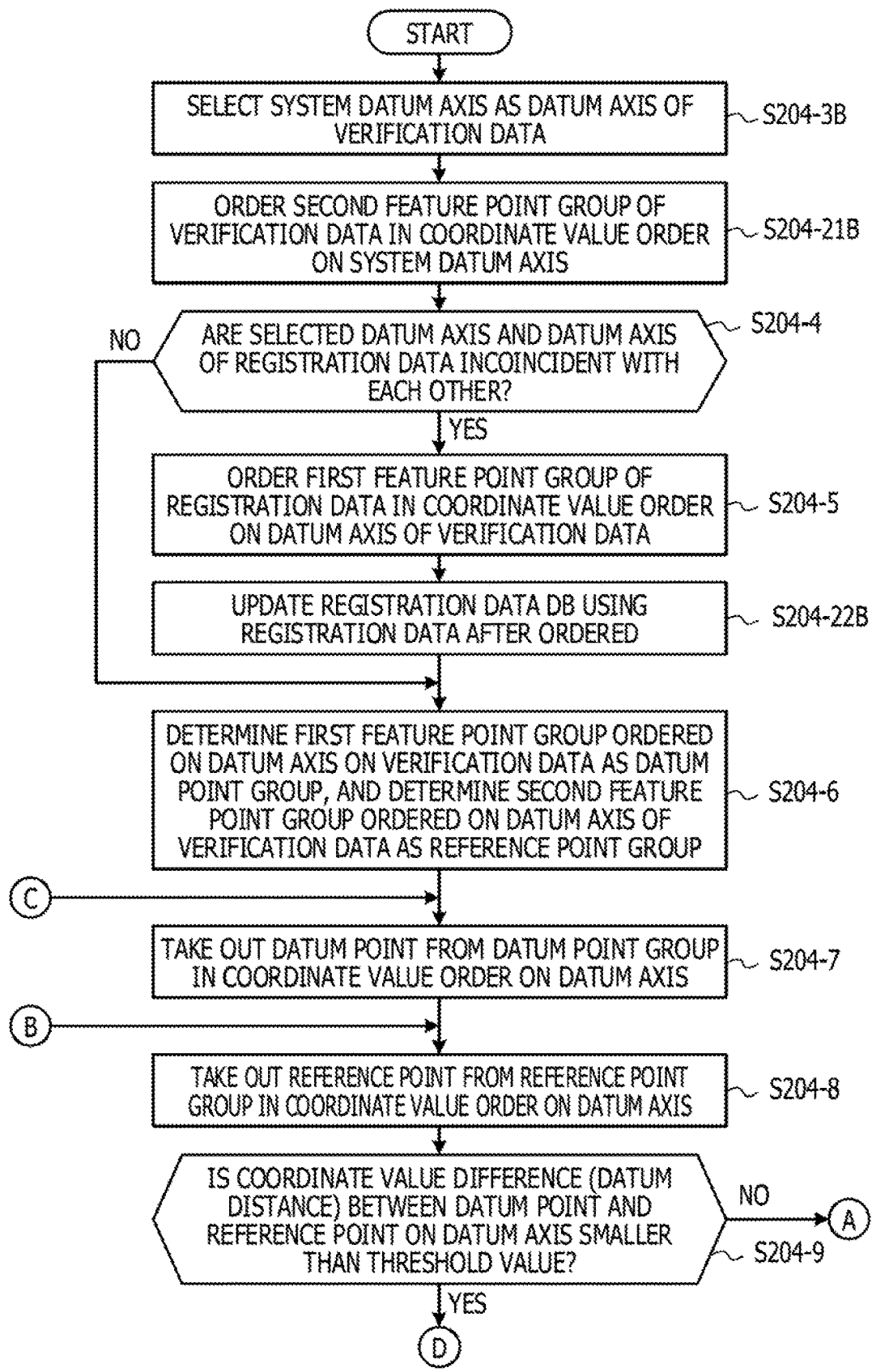
FIG. 21A is a flow chart illustrating an example of a verification process of feature points in an authentication mode implemented by an authentication processing unit in a modification to the working example 3.
Figure 21B:
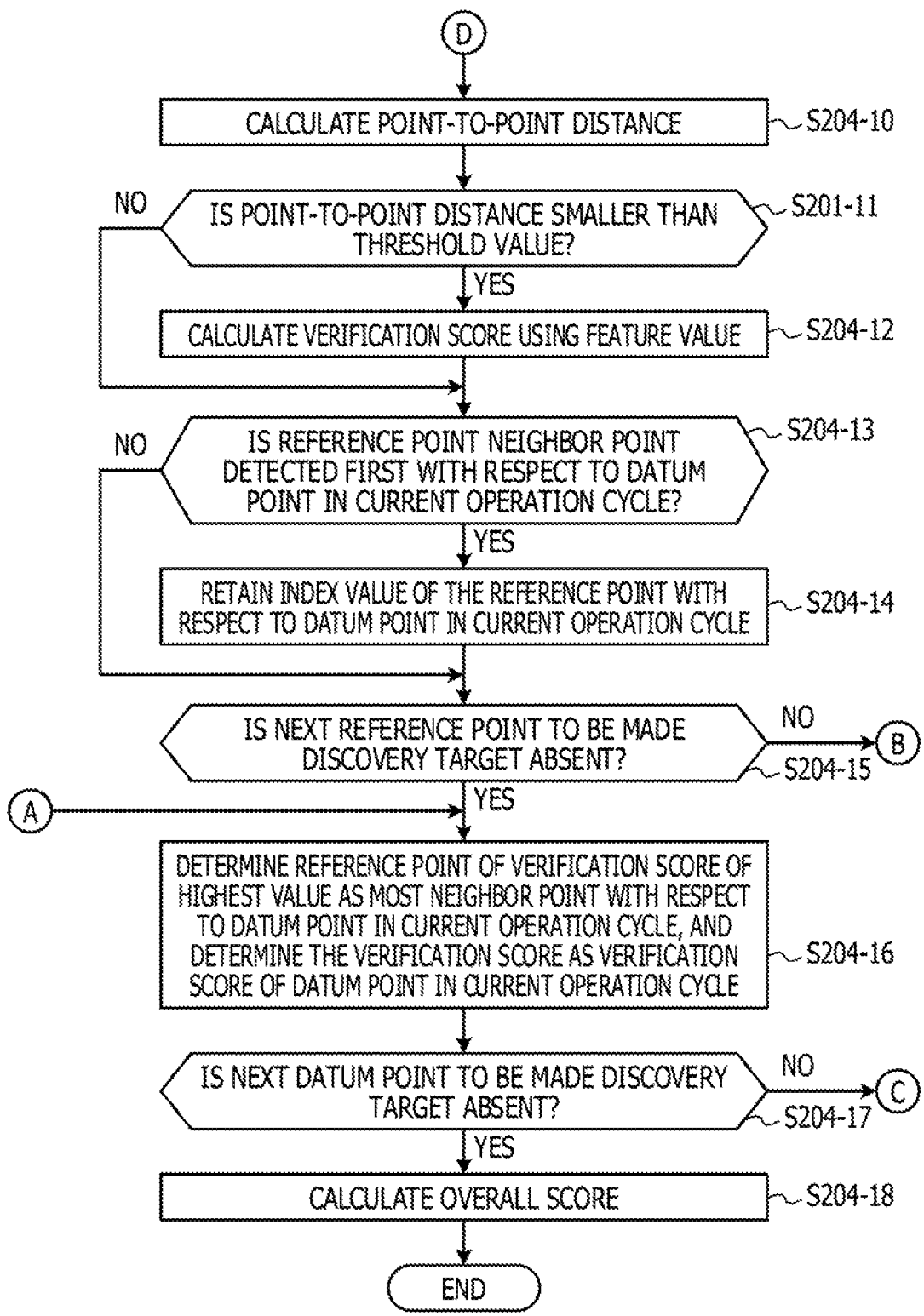
FIG. 21B is a flow chart illustrating an example of a verification process of feature points in an authentication mode implemented by an authentication processing unit in a modification to the working example 3.

As a modification to the working example 3, a system datum axis selected by the system datum axis selection unit 215B may be used as an optimum datum axis of verification data. FIG. 21 is a flow chart illustrating an example of a verification process of feature points in an authentication mode implemented by an authentication processing unit according to a modification to the working example 3. The authentication processing unit illustrated by reference to FIG. 21 may be the authentication processing unit 213 depicted in FIG. 17. The example of the processes illustrated in FIG. 21 may be executed when a valid value is set to the system datum axis information 23B.

In the process example illustrated in FIG. 21, the processor 1 does not execute the process S204-1 to the process S204-3 for selecting an optimum datum axis for a second feature point group of verification data but selects a system datum axis indicated by the system datum axis information 23B as a datum axis of the verification data (S204-3B). Then, the processor 1 orders the second feature point group of the verification data in the coordinate value order on the system datum axis (S204-21B). It is to be noted that, where, as a scanning direction of pixels when feature points are extracted from a biological image, the X axis is determined as a main scanning direction and the Y axis is determined as a sub scanning direction, one or more feature points extracted from a biological image are placed into a state in which they are ordered in the coordinate value order on the Y axis that is the sub scanning direction. Therefore, the processor 1 may treat the one or more feature points (verification data) acquired from the biological image by the process S202 as a second feature point group in which the feature points are ordered in the coordinate value order on the Y axis. In this case, when the system datum axis coincides with the sub scanning direction, the processor 1 may skip the process S204-21B without executing the same.

The processor 1 compares the datum axis of the verification data (for example, the system datum axis) and a datum axis indicated by datum axis information of the registration data (datum axis of the registration data) to determine whether or not the datum axis of the verification data and the datum axis of the registration data are incoincident with each other (S204-4). If the datum axis of the verification data and the datum axis of the registration data are incoincident with each other (YES in S204-4), the processor 1 orders the first feature point group of the registration data in the coordinate value order on the datum axis of the verification data (S204-5). Then, the processor 1 updates the registration data DB 22 using the registration data ordered in the coordinate value order on the datum axis of the verification data (for example, on the system datum axis) (S204-22B). It is assumed that, thereupon, the datum axis information of the registration data after ordered is set to a value indicating the system datum axis. When the registration data is referred to in the next or succeeding operation cycle by the process S204-22B, the system datum axis and the datum axis of the registration data coincide with each other, and the process S204-5 may not be executed.

In and after the process S204-6, process contents similar to the process contents in the process example of the working example 1 illustrated in FIG. 12 may be performed, description of them is omitted herein. It is to be noted that, upon 1:N authentication, the process for acquiring registration data from the registration data DB 22 (S203 of FIG. 11) may not be executed between the process S202 and the process S204 illustrated in FIG. 11 but may be executed between the process S204-3B and the process S204-4 or between the process S204-21B and the process S204-4 illustrated in FIG. 21. In this case, every time one registration data is acquired from the registration data DB 22 by the process S203, a series process of the processes S204-4 to S204-18 and the processes S205 to S207 may be executed to implement 1:N authentication.

Further, the present modification, the process S305 to the process S310 from among the processes of the system datum axis selection unit 215B may be omitted. This is because, if, in the verification process in the authentication mode illustrated in FIG. 21, the datum axis of the registration data and the system datum axis do not coincide with each other, the registration data are ordered in the coordinate value order on the system datum axis (S204-5) and the registration data DB 22 is updated using the registration data after ordered (S204-22B). Consequently, since the registration data may not re-ordered using the system datum axis, the arithmetic operation load by the process of the system datum axis selection unit may be reduced as much. Since the ratio of the datum axes of the inputted verification data may be considered to be substantially equal to the ratio of the datum axes of the registration data registered in the authentication system 100, by ordering the verification data on an axis coincident with the system datum axis, the probability that the ordering directions of the registration data stored in the registration data DB and the verification data may coincide with each other may be increased, and the response speed in feature point verification may be increased further while the verification accuracy of feature points is maintained. The authentication system 100 to which such a verification process as just described is applied may further improve the response speed of an authentication process while degradation of the authentication accuracy is suppressed. It is to be noted that the authentication system 100 described above is an example of a system to which the verification process according to the modification to the working example 3 is applied. As another example of the system to which the verification process according to the modification to the working example 3 is applied, a character recognition system, an object detection system and so forth may be listed. By applying the verification process according to the modification to the working example 3 to such application systems, for example, it is possible to increase the response speed in character recognition while the recognition accuracy is maintained or to raise the response speed in object detection while the detection accuracy is maintained.

Working Example 4

Now, a working example 4 is described. In one aspect of an authentication system 100 according to the working example 4, the working example 4 is different from the working example 1 in that an authentication process is performed using a first feature point group of registration data as a reference point group and using a second feature point group of verification data as a datum point group. Consequently, in the working example 4, a process for selecting an optimum datum axis for a second feature point group of verification data may not be executed. This is because, in the working example 4, a second feature point group of verification data (for example, a datum point group) may be ordered in the coordinate value order on a datum axis of a first feature point group of registration data (for example, a reference point group). Therefore, in the working example 4, execution of the process S204-1 to the process S204-3 in the verification process in the working example 1 illustrated in FIG. 12 may be omitted. Consequently, the response speed of feature point verification may be increased while the verification accuracy of feature points is maintained. The authentication system 100 to which such a verification process as just described is applied may improve the response speed of an authentication process while degradation of the authentication accuracy is suppressed.

Figure 22A:
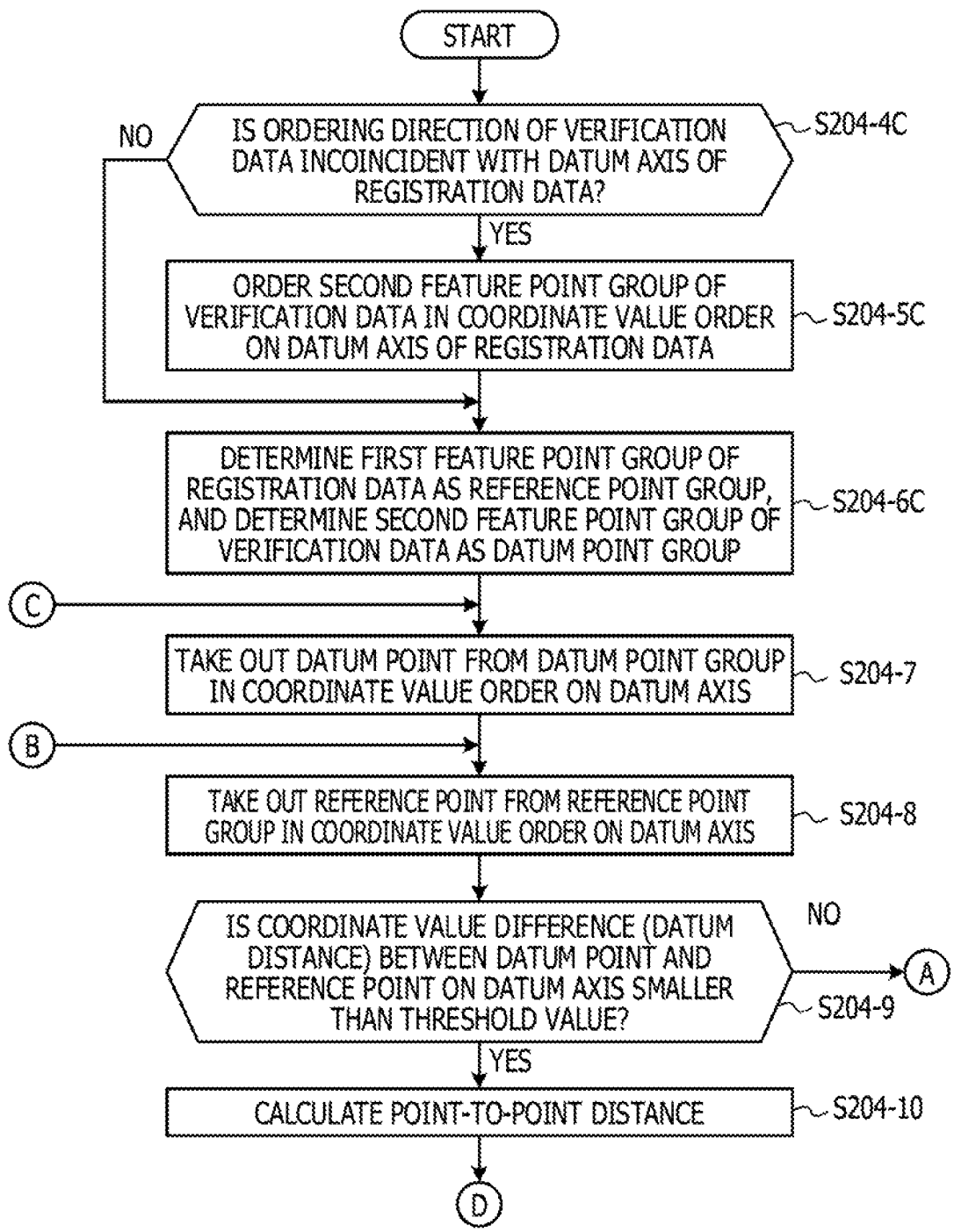
FIG. 22A is a flow chart illustrating an example of a verification process of feature points in an authentication mode implemented by an authentication processing unit in a working example 4.
Figure 22B:
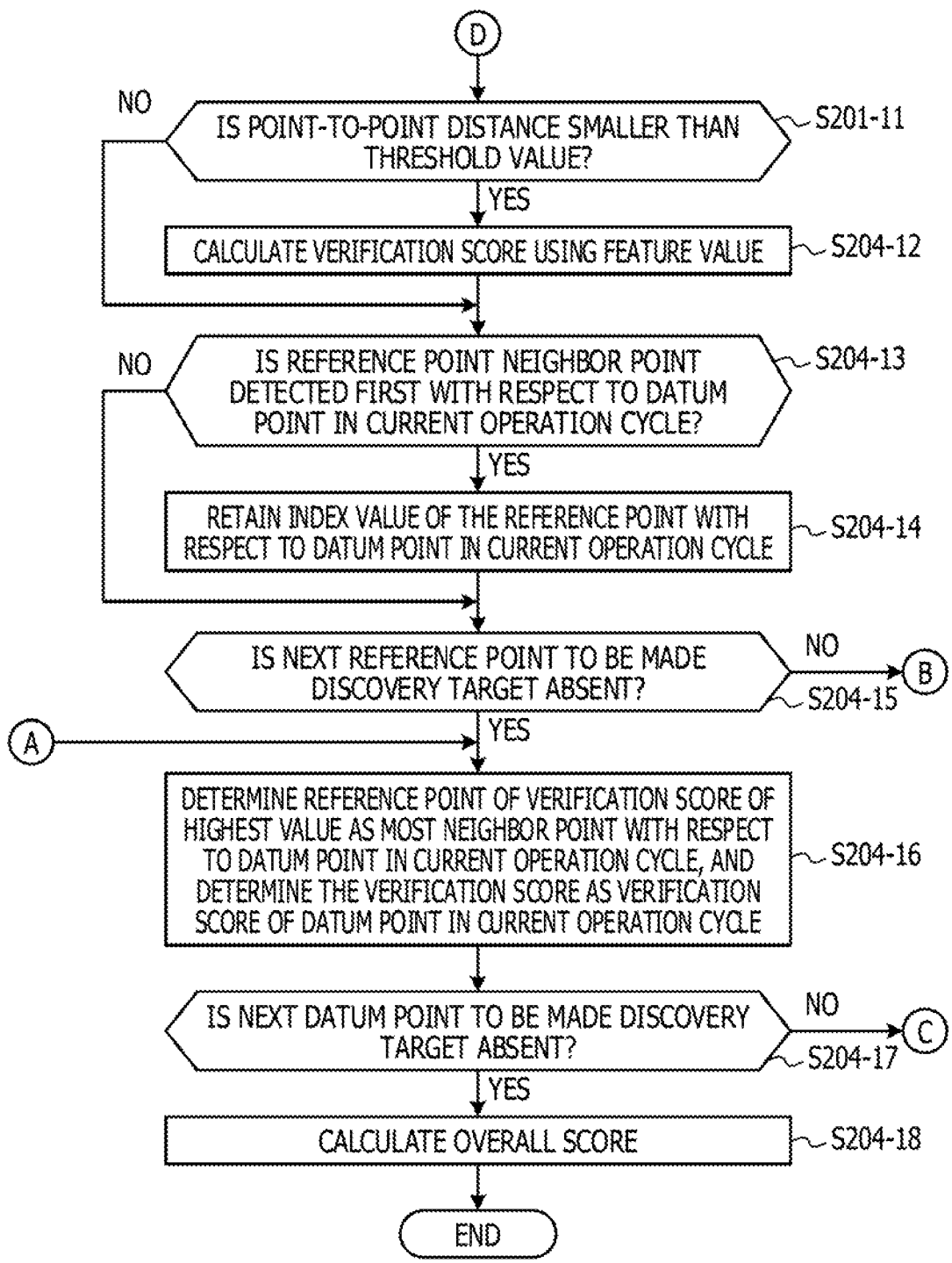
FIG. 22B is a flow chart illustrating an example of a verification process of feature points in an authentication mode implemented by an authentication processing unit in a working example 4.

FIG. 22 is a flow chart illustrating an example of a verification process of feature points in an authentication mode implemented by an authentication processing unit in the working example 4. The authentication processing unit illustrated by reference to FIG. 22 may be the authentication processing unit 213 depicted in FIG. 1. In the verification process illustrated in FIG. 22, the process S204-4 to the process S204-3 are omitted in comparison with the process example of the working example 1 illustrated in FIG. 12. This is because, in the authentication process (verification process) in the working example 4, the process for selecting an optimum datum axis for a second feature point group of verification data may not be executed.

First, the processor 1 determines whether or not the ordering direction of verification data is incoincident with the datum axis of registration data (S204-4C). For example, where, as a scanning direction of pixels when feature points are extracted from a biological image for verification, the X axis is determined as a main scanning direction and the Y axis is determined as a sub scanning direction, one or more feature points extracted from a biological image are placed into a state in which they are ordered in the coordinate value order on the Y axis that is the sub scanning direction. Accordingly, the processor 1 compares the sub scanning direction in scanning of pixels when feature points are extracted from the biological image for verification and the datum axis information T12 of the registration data with each other, and when the datum axis indicated by the datum axis information T12 of the registration data does not coincide with the sub scanning direction, the processor 1 may determine that the ordering direction of the verification data and the datum axis of the registration data are incoincident with each other.

If it is determined by the process S204-4C that the ordering direction of the verification data is incoincident with the datum axis of the registration data (YES in S204-4C), the processor 1 orders the second feature point group of the verification data using the datum axis indicated by the datum axis information T12 of the registration data (S204-5C). On the other hand, if it is determined by the process S204-4C that the ordering direction of the verification data is coincident with the datum axis of the registration data (NO in S204-4C), the processor 1 may skip the process S204-5C omitting execution of the same.

The processor 1 continues the processes illustrated in FIG. 22 determining the first feature point group of the registration data as a reference point group and determining the second feature point group of the verification data as a datum point group (S204-6C). It is to be noted that, in the process example illustrated in FIG. 22, the "datum axis" in and after a process S204-7 signifies an axis same as the datum axis of the registration data (first feature point group). Since, in the working example 4, the processes beginning with the process S204-7 are similar to the processes in the process example of the working example 1 illustrated in FIG. 12, description of them is omitted herein. Further, in the working example 4, since a flow of the overall authentication process may be same as the flow in the process example of the working example 1 illustrated in FIG. 11, description of the flow is omitted herein.

The foregoing is description of the processes according to the working example 4. Since, in the authentication system 100 according to the working example 4, for example, the processes by the registration processing unit 212 may be similar to the processes of the process example of the working example 1 illustrated in FIGS. 2 and 7, description of the processes is omitted herein. It is to be noted that, as description of the process example illustrated in FIG. 22, the description is given above focusing on an authentication process (verification process) between one verification data and one registration data. However, it is not to be interpreted that the working example 4 is limited to this but may be applied, for example, also to "1:N authentication" in which an authentication process (verification process) between one verification data and a plurality of registration data is performed. Where 1:N authentication is performed, the processor 1 may acquire, for example, totaling N registration data from the registration data DB 22 by the process S203 illustrated in FIG. 11. In this regard, the processor 1 may acquire N registration data by single time execution of the process S203. Alternatively, the processor 1 may loop the processes beginning with the process S203 for one registration data to acquire totaling N registration data. Alternatively, the process S203 by N times for acquiring registration data from the registration data DB 22 may not be executed between the process S202 and the process S204 illustrated in FIG. 11 but may be executed immediately before the process S204-4C illustrated in FIG. 22. In this case, every time one registration data is acquired from the registration data DB 22 by the process S203, the series process of the processes S204-4C to S204-18 and the processes S205 to S207 may be executed to implement 1:N authentication. Thereupon, an authentication process (verification process) between all of the N registration data and the verification data may be performed, or at the point of time at which an authentication result of success in authentication is obtained, the authentication process (verification process) of the loop by N times may be ended without acquiring later registration data from the registration data DB 22 and then an authentication result of success in authentication may be conveyed to the locking controlling device 6. Alternatively, upon 1:N authentication, every time a result of an authentication process (verification process) of one registration data with the verification data is obtained, the authentication result may not be conveyed to the locking controlling device 6. For example, if all of N authentication results obtained by an authentication process executed by N times using N registration data are all in failure, a single authentication result indicative of failure in authentication may be conveyed to the locking controlling device 6. Alternatively, if N authentication results obtained by an authentication process performed by N times using N registration data indicate N−1 authentication failures and one authentication success, the processor 1 may convey one authentication result indicative of success in authentication to the locking controlling device 6.

According to the working example 4 described above, since it is possible to select, upon registration process of registration data, an optimum datum axis for a reference point group in neighbor discovery by setting a first feature point group of the registration data as a reference point group and setting a second feature point group of the verification data as datum data, the datum axis selection process for the second feature point group of the verification data may not be executed, and the response speed in feature point verification may be increased as much and also the verification accuracy of feature points is maintained. The authentication system 100 to which such a verification process as just described is applied may suppress degradation of the authentication accuracy and may increase the response speed of an authentication process. It is to be noted that the authentication system 100 described above is an example of a system to which the verification process according to the working example 4 is applied. As another example of a system to which the verification process according to the working example 4 is applied, also a character recognition system, an object detection system and so forth may be listed. By applying the verification process according to the working example 4 to such application systems, for example, it is possible to increase the response speed in character recognition while the recognition accuracy is maintained or to raise the response speed in object detection while the detection accuracy is maintained.

[Modification 1 to Working Example 4]

As a modification to the working example 4, in the verification process, the process for ordering a second feature point group of verification data in the coordinate value order on a datum axis of registration data may be omitted. For example in the process example illustrated in FIG. 22, the process S204-5C may be omitted. The authentication processing unit 213 in the present modification may be configured such that it executes, in the process example illustrated in FIG. 22, the process (S204-14) for retaining an index value of a neighbor point (reference point) detected first with respect to a datum point in the current operation cycle when the ordering direction of verification data and the datum axis of registration data coincide with each other, but does not execute the process when the ordering direction of the verification data and the datum axis of the registration data do not coincide with each other. For example, when the ordering direction of the verification data and the datum axis of the registration data do not coincide with each other, neighbor discovery for a reference point with respect to a datum point may be started, for example, beginning with a reference point positioned first in the reference point group without reflecting a result of neighbor discovery of a datum point in the preceding operation cycle. According to the modification, after a reference point whose datum distance from a datum point is equal to or greater than a threshold value is detected in neighbor discovery in a verification process of feature points, reference points later in the coordinate value order on the datum axis may not be determined as a target for neighbor discovery, and therefore, the number of comparison targets for neighbor discovery may be reduced in comparison with that in an alternative case in which neighbor discovery is performed on a round-robin basis between the datum points and the reference points. Therefore the response speed in feature point verification may be increased while the verification accuracy of feature points is maintained. The authentication system 100 to which such a verification process as just described is applied may suppress increase of the arithmetic operation cost in an authentication process while degradation of the authentication accuracy is suppressed, and may significantly improve the response speed of an authentication process in 1:N authentication. It is to be noted that the authentication system 100 described above is an example of a system to which the verification process according to the modification 1 to the working example 4 is applied. As another example of a system to which the verification process according to modification 1 to the working example 4 is applied, also a character recognition system, an object detection system and so forth may be listed. By applying the verification process according to the modification 1 to the working example 4 to such application systems, for example, it is possible to increase the response speed in character recognition while the recognition accuracy is maintained or to raise the response speed in object detection while the detection accuracy is maintained.

[Modification 2 to Working Example 4]

As another modification to the working example 4, in the verification process, an execution result of the process for ordering a second feature point group of verification data in the coordinate value order on a datum axis of registration data may be retained (stored) in the storage device 2 until the authentication process for all of the verification data is completed. For example, in 1:N authentication in which verification of one verification data with a plurality of registration data is performed, by retaining an execution result of the process S204-5C, and, upon execution of the process S204-5C for the second time, by utilizing the execution result (ordering result) retained in the storage device 2, the arithmetic operation cost for ordering a second feature point group may be reduced. Therefore, the response speed in feature point verification may be increased while the verification accuracy of feature points is maintained. The authentication system 100 to which such a verification process as just described is applied may suppress increase of the arithmetic operation cost in an authentication process while degradation of the authentication accuracy is suppressed, and may significantly improve the response speed of an authentication process in 1:N authentication. It is to be noted that the authentication system 100 described above is an example of a system to which the verification process according to the modification 2 to the working example 4 is applied. As another example of a system to which the verification process according to modification 2 to the working example 4 is applied, also a character recognition system, an object detection system and so forth may be listed. By applying the verification process according to the modification 2 to the working, example 4 to such application systems, for example, it is possible to increase the response speed in character recognition while the recognition accuracy is maintained or to raise the response speed in object detection while the detection accuracy is maintained.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A method, performed by a computer, for a verification process configured to perform neighbor search on one or more feature points projected to an m-dimensional space (m is a natural number equal to or greater than 2), the method comprising:

executing a step A1 that includes
acquiring, for each datum axis of a plurality of datum axes, a feature point group including the one or more feature points projected to coordinate values of the m-dimensional space, each of the one or more feature points being ordered in a coordinate value order on the each datum axis, the plurality of datum axes being a plurality of coordinate axes in the m-dimensional space;

executing a step A2 that includes
acquiring, for the feature point group acquired for the each datum axis, a datum point group and a reference point group, the datum point including one or more datum points acquired from the one or more feature points of the feature point group, the reference point group including one or more reference points acquired from the one or more feature points of the feature point group;

executing a step A3 that includes,
searching, for each datum point of the one or more datum points included in the datum point group acquired for the each datum axis, a first reference point from among the one or more of reference points included in the reference point group, the first reference point being a reference point whose distance to the each datum point is smaller than a threshold value for the neighbor search, the searching of the first reference point being performed in an ordering direction order of the reference point group;

executing, for the each datum axis, a step A4 that includes
a step A4-1 configured to measure a comparison time number, the comparison time number being a number of time the distance to the each datum point is compared in the searching of the first reference point in the step A3,
a step A4-2 configured to obtain the comparison time number with regard to the each datum point in response to detection of a second reference point after detection of the first reference point, the second reference point being a reference point whose distance to the each datum point on the datum axis is equal to or greater than the threshold value, and
a step A4-3 configured to acquire a total comparison time number by totaling the obtained comparison time in the searching of the first reference point for the each datum point; and executing a step A5 that includes
selecting an optimum datum axis from among the plurality of datum axes in accordance with the total comparison time number, the optimum datum axis being a datum axis whose the total comparison time number is smallest, the selected optimum datum axis being treated as a datum axis to be used in the neighbor search in the verification process, executing a step B1 that includes
acquiring an image for verification from a sensor, and executing the step A1 to the step A5 for verification data including one or more feature points having coordinate values of the m-dimensional space acquired from the image for verification to select a datum axis optimum to the verification data;

executing a step B2 that includes
acquiring, from a storage device, registration data including one or more feature points having coordinate values of the m-dimensional space ordered in the coordinate value order on one of the coordinate axes that define the m-dimensional space;

executing a step B3 that includes
ordering, when the ordering direction of the one or more feature points the registration data have and the datum axis selected at the step B1 do not coincide with each other, the one or more feature points of the registration data in the coordinate value order on the datum axis selected at the step B1;

executing a step B4 that includes
acquiring a datum point group including one or more datum points given by the one or more feature points of the registration data ordered in a same direction as direction of the datum axis selected at the step B1;

executing a step B5 that includes
acquiring a reference point group including one or more reference points given by the one or more feature points of the verification data ordered in the coordinate value order on the datum axis selected at the step B1;

executing a step B6 that includes
taking out a datum point in the coordinate value order on the datum axis selected at the step B1 from within the datum point group, and
performing the neighbor search between the datum point and the reference points in the ordering direction order of the reference point group; and executing a step B7 that includes
determining the reference point detected as a neighbor point by the neighbor search in the step B6, as a calculation target of a verification score with the datum points.

2. The method according to claim 1, further comprising:
executing a step C1 that includes
acquiring an image for registration from the sensor, and executing the step A1 to the step A5 for one or more feature points having coordinate values in the m-dimensional space acquired from the image for registration to select the optimum datum axis; and executing a step C2 that includes
storing registration data including a feature point group in which the one or more feature points acquired from the image for registration are ordered in the coordinate value order on the datum axis selected at the step C1 and information relating to the datum axis selected at the step C1 into the storage device.

3. The method according to claim 2, further comprising:
executing a step D1 that includes
generating an index conversion pair for converting an ordering result of the feature point group ordered on a coordinate axis different from the datum axis selected at the step C1 and an ordering result of the feature point group ordered on a coordinate axis same as the datum axis selected at the step C1 from among the feature point groups for each of the datum axes acquired at the step A1 when the step C1 is executed, wherein, the step C2 includes storing registration data including the feature point group in which the one or more feature points acquired from the image for registration are ordered in the coordinate value order on the datum axis selected at the step C1, the information relating to the datum axis selected at the step C1, and the index conversion pair generated at the step D1 into the storage device, and the step B3 includes making it possible to access the one or more feature points of the registration data in the coordinate value order on the datum axis selected at the step B1 using the index conversion pair of the registration data when the ordering direction of the one or more feature points the registration data have and the datum axis selected at the step B1 do not coincide with each other.

4. The method according to claim 2, further comprising:
executing a step E1 that includes collecting, for each of the one or more registration data stored in the storage unit, information relating to the datum axis selected at the step C1, and the number of feature points the feature point group of the registration data has;
executing a step E2 that includes totaling the number of the feature points for each of the datum axes indicated by the information collected at the step E1;
executing a step E3 that includes selecting a datum axis that has, from among the number of feature points for each of the datum axes totaled at the step E2, the number whose ratio to a whole number obtained by totaling the number of the feature points for each of the datum axes is highest and whose ratio is equal to or higher than a given value as a system datum axis; and
executing a step E4 that includes re-ordering the feature point group of the registration data ordered on the coordinate axis different from the system datum axis selected at the step E3 in the coordinate value order on the system datum axis.

5. The method according to claim 2, further comprising:
executing a step E1 that includes collecting, for each of the one or more pieces of registration data stored in the storage device, information relating to the datum axis selected at the step C1, and the number of feature points the feature point group of the registration data has;
executing a step E2 that includes totaling the number of the feature points for each of the datum axes indicated by the information collected at the step E1; and
executing a step E3 that includes selecting a datum axis that has, from among the number of feature points for each of the datum axes totaled at the step E2, the number whose ratio to a whole number obtained by totaling the number of the feature points for each of the datum axes is highest and whose ratio is equal to or higher than a given value as a system datum axis, wherein
the step B1 includes selecting the system datum axis selected at the step E3 as a datum axis optimum to the verification data in place of execution of the step A1 to the step A5.

6. The method according to claim 1, further comprising:
executing a step F1 that includes acquiring, from a storage unit, registration data including a feature point group including one or more feature points having coordinate values of the m-dimensional space ordered in the coordinate value order on one of the coordinate axes that define the m-dimensional space and information indicative of a datum axis that is the ordering direction of the feature point group;

executing a step F2 that includes acquiring an image for verification from a sensor and acquiring verification data including one or more feature points having coordinate values of the m-dimensional space acquired from the image for verification;

executing a step F3 that includes ordering, when the ordering direction of the one or more feature points the verification data have and the datum axis of the registration data do not coincide with each other, the one or more feature points of the verification data in the coordinate value order on the datum axis of the registration data;

executing a step F4 that includes acquiring a reference point group in which the one or more feature points of the feature point group the registration data acquired at the step F1 have are determined as one or more reference points;

executing a step F5 that includes acquiring a datum point group in which one or more feature points of the verification data ordered in the coordinate value order on a coordinate axis same as the datum axis of the registration data are determined as one or more datum points;

executing a step F6 that includes taking out the datum points in the coordinate value order on the datum axis of the registration data from within the datum point group and performing the neighbor search of the datum point and the reference points in the ordering direction order of the reference point group; and executing a step F7 that includes determining the reference points detected as neighbor points by the neighbor search in the step F6, as a calculation target of a verification score with the datum point.

7. An apparatus for a verification process configured to perform neighbor search on one or more feature points projected to an m-dimensional space (m is a natural number equal to or greater than 2), the apparatus comprising:

a memory;

a processor coupled to the memory and configured to execute a step A1 that includes acquiring for each datum axis of a plurality of datum axes, a feature point group including the one or more feature points projected to coordinate values of the m-dimensional space, each of the one or more feature points being ordered in a coordinate value order on the each datum axis, the plurality of datum axes being a plurality of coordinate axes in the m-dimensional space, execute a step A2 that includes acquiring, for the feature point group acquired for the each datum axis, a datum point group and a reference point group, the datum point group including one or more datum points acquired from the one or more feature points of the feature point group, the reference point group including one or more reference points acquired from the one or more feature points of the feature point group, execute a step A3 that includes, searching, for each datum point of the one or more datum points included in the datum point group acquired for the each datum axis, a first reference point from among the one or more of reference points included in the reference point group, the first reference point being a reference point whose distance to the each datum point is smaller than a threshold value for the neighbor search, the searching of the first reference point being performed in an ordering direction order of the reference point group, execute, for the each datum axis, a step A4 that includes a step A4-1 configured to measure a comparison time number, the comparison time number being a number of time the distance to the each datum point is compared in the searching of the first reference point in the step A3, a step A4-2 configured to obtain the comparison time number with regard to the each datum point in response to detection of a second reference point after detection of the first reference point, the second reference point being a reference point whose distance to the each datum point on the datum axis is equal to or greater than the threshold value, and a step A4-3 configured to acquire a total comparison time number by totaling the obtained comparison time number in the searching of the first reference point for the each datum point; and execute a step A5 that includes selecting an optimum datum axis from among the plurality of datum axes in accordance with the total comparison time number, the optimum datum axis being a datum axis whose the total comparison time number is smallest, the selected optimum datum axis being treated as a datum axis to be used in the neighbor search in the verification process, execute a step B1 that includes acquiring an image for verification from a sensor, and executing the step A1 to the step A5 for verification data including one or more feature points having coordinate values of the m-dimensional space acquired from the image for verification to select a datum axis optimum to the verification data;

execute a step B2 that includes acquiring, from a storage device, registration data including one or more feature points having coordinate values of the m-dimensional space ordered in the coordinate value order on one of the coordinate axes that define the m-dimensional space;

execute a step B3 that includes ordering, when the ordering direction of the one or more feature points the registration data have and the datum axis selected at the step B1 do not coincide with each other, the one or more feature points of the registration data in the coordinate value order on the datum axis selected at the step B1;

execute a step B4 that includes acquiring a datum point group including one or more datum points given by the one or more feature points of the registration data ordered in a same direction as direction of the datum axis selected at the step B1;

execute a step B5 that includes acquiring a reference point group including one or more reference points given by the one or more feature points of the verification data ordered in the coordinate value order on the datum axis selected at the step B1;

execute a step B6 that includes taking out a datum point in the coordinate value order on the datum axis selected at the step B1 from within the datum point group, and performing the neighbor search between the datum point and the reference points in the ordering direction order of the reference point group; and execute a step B7 that includes
 determining the reference point detected as a neighbor point by the neighbor search in the step B6, as a calculation target of a verification score with the datum points.

8. The apparatus according to claim 7, wherein
the processor is configured to
execute a step C1 that includes
 acquiring an image for registration from the sensor, and executing the step A1 to the step A5 for one or more feature points having coordinate values in the m-dimensional space acquired from the image for registration to select the optimum datum axis; and
execute a step C2 that includes
 storing registration data including a feature point group in which the one or more feature points acquired from the image for registration are ordered in the coordinate value order on the datum axis selected at the step C1 and information relating to the datum axis selected at the step C1 into the storage device.

9. The apparatus according to claim 8, wherein
the processor is configured to
execute a step D1 that includes generating an index conversion pair for converting an ordering result of the feature point group ordered on a coordinate axis different from the datum axis selected at the step C1 and an ordering result of the feature point group ordered on a coordinate axis same as the datum axis selected at the step C1 from among the feature point groups for each of the datum axes acquired at the step A1 when the step C1 is executed, wherein,
the step C2 includes storing registration data including the feature point group in which the one or more feature points acquired from the image for registration are ordered in the coordinate value order on the datum axis selected at the step C1, the information relating to the datum axis selected at the step C1, and the index conversion pair generated at the step D1 into the storage device, and
the step B3 includes making it possible to access the one or more feature points of the registration data in the coordinate value order on the datum axis selected at the step B1 using the index conversion pair of the registration data when the ordering direction of the one or more feature points the registration data have and the datum axis selected at the step B1 do not coincide with each other.

10. The apparatus according to claim 8, wherein
the processor is configured to
execute a step E1 that includes collecting, for each of the one or more registration data stored in the storage unit, information relating to the datum axis selected at the step C1, and the number of feature points the feature point group of the registration data has;
execute a step E2 that includes totaling the number of the feature points for each of the datum axes indicated by the information collected at the step E1;
execute a step E3 that includes selecting a datum axis that has, from among the number of feature points for each of the datum axes totaled at the step E2, the number whose ratio to a whole number obtained by totaling the number of the feature points for each of the datum axes is highest and whose ratio is equal to or higher than a given value as a system datum axis; and
execute a step E4 that includes re-ordering the feature point group of the registration data ordered on the coordinate axis different from the system datum axis selected at the step E3 in the coordinate value order on the system datum axis.

11. The apparatus according to claim 8, wherein
the processor is configured to
execute a step E1 that includes collecting, for each of the one or more pieces of registration data stored in the storage device, information relating to the datum axis selected at the step C1, and the number of feature points the feature point group of the registration data has;
execute a step E2 that includes totaling the number of the feature points for each of the datum axes indicated by the information collected at the step E1; and
execute a step E3 that includes selecting a datum axis that has, from among the number of feature points for each of the datum axes totaled at the step E2, the number whose ratio to a whole number obtained by totaling the number of the feature points for each of the datum axes is highest and whose ratio is equal to or higher than a given value as a system datum axis, wherein
the step B1 includes selecting the system datum axis selected at the step E3 as a datum axis optimum to the verification data in place of execution of the step A1 to the step A5.

12. The apparatus according to claim 7, wherein
the processor is configured to
execute a step F1 that includes acquiring, from a storage unit, registration data including a feature point group including one or more feature points having coordinate values of the m-dimensional space ordered in the coordinate value order on one of the coordinate axes that define the m-dimensional space and information indicative of a datum axis that is the ordering direction of the feature point group;
execute a step F2 that includes acquiring an image for verification from a sensor and acquiring verification data including one or more feature points having coordinate values of the m-dimensional space acquired from the image for verification;
execute a step F3 that includes ordering, when the ordering direction of the one or more feature points the verification data have and the datum axis of the registration data do not coincide with each other, the one or more feature points of the verification data in the coordinate value order on the datum axis of the registration data;
execute a step F4 that includes acquiring a reference point group in which the one or more feature points of the feature point group the registration data acquired at the step F1 have are determined as one or more reference points;
execute a step F5 that includes acquiring a datum point group in which one or more feature points of the verification data ordered in the coordinate value order on a coordinate axis same as the datum axis of the registration data are determined as one or more datum points;
execute a step F6 that includes taking out the datum points in the coordinate value order on the datum axis of the registration data from within the datum point group and performing the neighbor search of the datum point and the reference points in the ordering direction order of the reference point group; and
execute a step F7 that includes determining the reference points detected as neighbor points by the neighbor search in the step F6, as a calculation target of a verification score with the datum point.

13. A non-transitory computer-readable storage medium for storing a program for a verification process configured to perform neighbor search on one or more feature points projected to an m-dimensional space (m is a natural number equal to or greater than 2), the program configured to cause a computer to execute a process, the process comprising:

executing a step A1 that includes
acquiring, for each datum axis of a plurality of datum axes, a feature point group including the one or more feature points projected to coordinate values of the m-dimensional space, each of the one or more feature points being ordered in a coordinate value order on the each datum axis, the plurality of datum axes being a plurality of coordinate axes in the m-dimensional space;

executing a step A2 that includes
acquiring, for the feature point group acquired for the each datum axis, a datum point group and a reference point group, the datum point group including one or more datum points acquired from the one or more feature points of the feature point group, the reference point group including one or more reference points acquired from the one or more feature points of the feature point group;

executing a step A3 that includes
searching, for each datum point of the one or more datum points included in the datum point group acquired for the each datum axis, a first reference point from among the one or more of reference points included in the reference point group, whose distance to the each datum point is smaller than a threshold value for the neighbor search, the searching of the first reference point being performed in an ordering direction order of the reference point group;

executing, for the each datum axis, a step A4 that includes
a step A4-1 configured to measure a comparison time number, the comparison time number being a number of time the distance to the each datum point is compared in the searching of the first reference point in the step A3,
a step A4-2 configured to obtain the comparison time number with regard to the each datum point in response to detection of a second reference point after detection of the first reference point, the second reference point being a reference point whose distance to the each datum point on the datum axis is equal to or greater than the threshold value, and
a step A4-3 configured to acquire a total comparison time number by totaling the obtained comparison time number in the searching of the first reference point for the each datum point; and executing a step A5 that includes selecting an optimum datum axis from among, the plurality of datum axes in accordance with the total comparison time number, the optimum datum axis being a datum axis whose the total comparison time number is smallest, the selected optimum datum axis being treated as a datum axis to be used as an in the neighbor search in the verification process, executing a step B1 that includes
acquiring an image for verification from a sensor, and executing the step A1 to the step A5 for verification data including one or more feature points having coordinate values of the m-dimensional space acquired from the image for verification to select a datum axis optimum to the verification data;

executing a step B2 that includes
acquiring, from a storage device, registration data including one or more feature points having coordinate values of the m-dimensional space ordered in the coordinate value order on one of the coordinate axes that define the m-dimensional space;

executing a step B3 that includes
ordering, when the ordering direction of the one or more feature points the registration data have and the datum axis selected at the step B1 do not coincide with each other, the one or more feature points of the registration data in the coordinate value order on the datum axis selected at the step B1;

executing a step B4 that includes
acquiring a datum point group including one or more datum points given by the one or more feature points of the registration data ordered in a same direction as direction of the datum axis selected at the step B1:

executing a step B5 that includes
acquiring a reference point group including one or more reference points given by the one or more feature points of the verification data ordered in the coordinate value order on the datum axis selected at the step B1:

executing a step B6 that includes
taking out a datum point in the coordinate value order on the datum axis selected at the step B1 from within the datum point group, and
performing the neighbor search between the datum point and the reference points in the ordering direction order of the reference point group: and executing a step B7 that includes
determining the reference point detected as a neighbor point by the neighbor search in the step B6, as a calculation target of a verification score with the datum points.

14. The non-transitory computer-readable storage medium according to claim 13, further comprising:
executing a step C1 that includes
acquiring an image for registration from the sensor, and executing the step A1 to the step A5 for one or more feature points having coordinate values in the m-dimensional space acquired from the image for registration to select the optimum datum axis; and executing a step C2 that includes
storing registration data including a feature point group in which the one or more feature points acquired from the image for registration are ordered in the coordinate value order on the datum axis selected at the step C1 and information relating to the datum axis selected at the step C1 into the storage device.

15. The non-transitory computer-readable storage medium according to claim 14, further comprising:
executing a step D1 that includes generating an index conversion pair for converting an ordering result of the feature point group ordered on a coordinate axis different from the datum axis selected at the step C1 and an ordering result of the feature point group ordered on a coordinate axis same as the datum axis selected at the step C1 from among the feature point groups for each of the datum axes acquired at the step A1 when the step C1 is executed, wherein,
the step C2 includes storing registration data including the feature point group in which the one or more feature points acquired from the image for registration are ordered in the coordinate value order on the datum axis selected at the step C1, the information relating to the datum axis selected at the step C1, and the index conversion pair generated at the step D1 into the storage device, and the step B3 includes making it possible to access the one or more feature points of the registration data in the coordinate value order on the datum axis selected at the step B1 using the index conversion pair of the registration data when the ordering direction of the one or more feature points the registration data have and the datum axis selected at the step B1 do not coincide with each other.

16. The non-transitory computer-readable storage medium according to claim 14, further comprising:

executing a step E1 that includes collecting, for each of the one or more registration data stored in the storage unit, information relating to the datum axis selected at the step C1, and the number of feature points the feature point group of the registration data has;

executing a step E2 that includes totaling the number of the feature points for each of the datum axes indicated by the information collected at the step E1;

executing a step E3 that includes selecting a datum axis that has, from among the number of feature points for each of the datum axes totaled at the step E2, the number whose ratio to a whole number obtained by totaling the number of the feature points for each of the datum axes is highest and whose ratio is equal to or higher than a given value as a system datum axis; and executing a step E4 that includes re-ordering the feature point group of the registration data ordered on the coordinate axis different from the system datum axis selected at the step E3 in the coordinate value order on the system datum axis.

17. The non-transitory computer-readable storage medium according to claim 14, further comprising:

executing a step E1 that includes collecting, for each of the one or more pieces of registration data stored in the storage device, information relating to the datum axis selected at the step C1, and the number of feature points the feature point group of the registration data has;

executing a step E2 that includes totaling the number of the feature points for each of the datum axes indicated by the information collected at the step E1; and executing a step E3 that includes selecting a datum axis that has, from among the number of feature points for each of the datum axes totaled at the step E2, the number whose ratio to a whole number obtained by totaling the number of the feature points for each of the datum axes is highest and whose ratio is equal to or higher than a given value as a system datum axis, wherein the step B1 includes selecting the system datum axis selected at the step E3 as a datum axis optimum to the verification data in place of execution of the step A1 to the step A5.

* * * * *